United States Patent
Akimoto

(10) Patent No.: US 8,086,887 B2
(45) Date of Patent: Dec. 27, 2011

(54) APPARATUS, SYSTEM AND METHOD FOR POWER MANAGEMENT

(75) Inventor: Shunsuke Akimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 638 days.

(21) Appl. No.: 12/232,003

(22) Filed: Sep. 9, 2008

(65) Prior Publication Data

US 2009/0077407 A1 Mar. 19, 2009

(30) Foreign Application Priority Data

Sep. 18, 2007 (JP) ................................. 2007-240889

(51) Int. Cl.
*G06F 1/00* (2006.01)
*G06F 1/26* (2006.01)

(52) U.S. Cl. ......... 713/340; 713/300; 713/310; 713/320

(58) Field of Classification Search ............... 713/300, 713/320, 340
See application file for complete search history.

(56) References Cited

U.S. PATENT DOCUMENTS

| 7,328,355 | B2 | 2/2008 | Arakawa | |
|---|---|---|---|---|
| 7,441,133 | B2 * | 10/2008 | Giat et al. | 713/300 |
| 7,539,881 | B2 * | 5/2009 | Shaw et al. | 713/300 |
| 7,779,276 | B2 * | 8/2010 | Bolan et al. | 713/300 |
| 7,793,126 | B2 * | 9/2010 | McGrane et al. | 713/320 |
| 7,802,120 | B2 * | 9/2010 | Conroy et al. | 713/340 |
| 7,831,843 | B2 * | 11/2010 | Brundridge et al. | 713/300 |

FOREIGN PATENT DOCUMENTS

| JP | 2005-202506 | 7/2005 |
|---|---|---|
| JP | 2005-338986 A | 12/2005 |
| JP | 2008-83841 A | 4/2008 |

* cited by examiner

*Primary Examiner* — Brian Misiura
(74) *Attorney, Agent, or Firm* — McGinn IP Law Group, PLLC

(57) ABSTRACT

An apparatus which communicates with another apparatus includes a control unit which monitors a power consumption of the apparatus, supplies a power to the another apparatus when the power consumption includes a surplus, and requests the another apparatus to supply the power when the power consumption includes a shortage, and an adjusting unit which adjusts the power consumption of the apparatus according to an operation of the control unit.

18 Claims, 19 Drawing Sheets

Fig. 3

222 MINIMUM POWER CONSUMPTION VALUE TABLE

| SERVER IDENTIFIER | MINIMUM POWER CONSUMPTION VALUE |
|---|---|
| SERVER 101-1 | $W_{MIN1}$ |
| SERVER 101-2 | $W_{MIN2}$ |
| ⋮ | ⋮ |
| SERVER 101-n | $W_{MINn}$ |

Fig. 4

223 MAXIMUM POWER CONSUMPTION VALUE TABLE

| SERVER IDENTIFIER | MAXIMUM POWER CONSUMPTION VALUE |
|---|---|
| SERVER 101-1 | $W_{MAX1}$ |
| SERVER 101-2 | $W_{MAX2}$ |
| ⋮ | ⋮ |
| SERVER 101-n | $W_{MAXn}$ |

Fig. 5

POWER REQUEST COMMUNICATION DATA 311

| HEADER (312) | IDENTIFIER (313) | ADDITIONAL POWER REQUEST AMOUNT (314) |

POWER REQUEST-RESPONSE COMMUNICATION DATA 321

| HEADER (322) | IDENTIFIER (323) | AMOUNT OF POWER PERMITTED TO BE SECURED (324) |

POWER RELEASE NOTIFICATION COMMUNICATION DATA 331

| HEADER (332) | IDENTIFIER (333) | POWER RELEASE AMOUNT (334) |

POWER REDUCTION REQUEST COMMUNICATION DATA 341

| HEADER (342) | IDENTIFIER (343) | POWER REDUCTION REQUEST AMOUNT (344) |

Fig. 6

122 COMPONENT POWER LIMIT VALUE TABLE

| COMPONENT IDENTIFIER | COMPONENT POWER LIMIT VALUE |
|---|---|
| PROCESSOR | $W_{CPU}$ |
| MEMORY | $W_{MEM}$ |
| CHIP SET | $W_{CIP}$ |
| DISK DRIVE | $W_{DISK}$ |

123 PERFORMANCE-TO-POWER TABLE

| MAXIMUM OPERATING FREQUENCY | MAXIMUM POWER CONSUMPTION |
|---|---|
| 100M | 50W |
| 80M | 40W |
| 60M | 30W |
| ⋮ | ⋮ |

124 TEMPORARY SAVE TABLE

| COMPONENT IDENTIFIER | NEW POWER LIMITATION VALUE | EXCESS OR SHORTAGE POWER |
|---|---|---|
| PROCESSOR | | |
| MEMORY | | |
| CHIP SET | | |
| DISK DRIVE | | |

Fig. 23

502 POWER EXCESS OR SHORTAGE
DETERMINATION THRESHOLD TABLE

| COMPONENT IDENTIFIER | UPPER LOAD THRESHOLD | LOWER LOAD THRESHOLD |
|---|---|---|
| PROCESSOR | | |
| MEMORY | | |
| CHIP SET | | |
| DISK DRIVE | | |

APPARATUS, SYSTEM AND METHOD FOR POWER MANAGEMENT

INCORPORATION BY REFERENCE

This application is based upon and claims the benefit of priority from Japanese patent application No. 2007-240889, filed on Sep. 18, 2007, the disclosure of which is incorporated herein in its entirety by reference.

BACKGROUND OF THE INVENTION

1. Field of the Invention

A present invention relates to a power management system and a power management method in a computer system including a plurality of computers.

2. Description of Related Art

In recent years, since power consumption has been rapidly increasing due to development of high performance of a single computer, the power consumption of an entire computer system such as a blade server system including a plurality of computers has been significantly increasing. Consequently, there is a strong demand for reducing maximum power consumption of the entire computer system while guaranteeing a certain performance (power) for each computer.

An example of a technique for reducing the power consumption of the entire computer system to less than or equal to a certain value while guaranteeing a certain performance (power) for the computer which is included in the computer system, is described in Patent Document 1. In a power management system described in Patent Document 1, in order to keep power consumed by a blade server including a plurality of blades, each of which operates like a computer, within a range of maximum power which can be supplied from a power supply box, an operating frequency of a CPU of the blade is limited.

For example in the Patent Document 1, in a blade system configured with three blades, a supplied power condition is set in which the power consumption of the entire blade server is held within the range of the maximum power which can be supplied, if the operating frequency of the CPU of one blade is set to 100% of a maximum value and the operating frequencies of the CPUs of the other two blades are set to 50% of the maximum value.

The supplied power condition is set according to a priority set to each blade, the operating frequency of the CPU of one blade is controlled to be less than or equal to 100%, and the operating frequencies of the CPUs of the other two blades are controlled to be less than or equal to 50% so that the supplied power condition may be satisfied during system exemplary operation.

Moreover, an operating status of the blade with the CPU operating frequency of 100% is monitored. If the blade has kept on operating at the operating frequency less than or equal to 50% for more than or equal to a certain period, then an upper limit of the operating frequency of the CPU of the blade is changed to 50%, and instead of changing the operating frequency of the CPU to 50%, among the other two blades, the upper limit of the operating frequency of the CPU is changed from 50% to 100%.

[Patent Document 1] Japanese Patent Laid-Open No. 2005-202506

SUMMARY OF THE INVENTION

According to one exemplary aspect of the present invention, an apparatus which communicates with another apparatus includes a control unit which monitors a power consumption of the apparatus, supplies a power to the another apparatus when the power consumption includes a surplus, and requests the another apparatus to supply the power when the power consumption includes a shortage, and adjusting unit which adjusts the power consumption of the apparatus according to an operation of the control unit.

According to another exemplary aspect of the present invention, a system including a first apparatus and a second apparatus includes a control unit which monitors a power consumption of the first apparatus, supplies a power to the second apparatus when the power consumption includes a surplus, and requests the second apparatus to supply the power when the power consumption includes a shortage, and adjusting unit which adjusts the power consumption of the first apparatus according to an operation of the control unit.

According to another exemplary aspect of the present invention, a method of controlling a first apparatus and a second apparatus includes monitoring a power consumption of the first apparatus, supplying a power to the second apparatus when the power consumption includes a surplus, requesting the second apparatus to supply the power when the power consumption includes a shortage, and adjusting the power consumption of the first apparatus according to an operation of the control unit.

BRIEF DESCRIPTION OF THE DRAWINGS

Other exemplary aspects and advantages of the invention will be made more apparent by the following detailed description and the accompanying drawings, wherein:

FIG. 3 is a diagram showing an example of a minimum power consumption value table 222 used in the second exemplary embodiment of the present invention.

FIG. 4 is a diagram showing an example of a maximum power consumption value table 223 used in the second exemplary embodiment of the present invention.

FIG. 5 is a diagram showing an example of communication data used in the second exemplary embodiment of the present invention.

FIG. 6 is a diagram showing an example of a component power limit value table 122 used in the second exemplary embodiment of the present invention.

FIG. 23 is a diagram showing an example of a power excess or shortage determination threshold table 502 used by the server in the fourth exemplary embodiment of the present invention.

DETAILED DESCRIPTION OF THE EXEMPLARY EMBODIMENTS

The technique as described in Patent Document 1 has been proposed in order to reduce the maximum power consumption of the entire computer system while guaranteeing a certain performance (power) for the computer included in the system. However, there has been a drawback in that there has been no effective utilization of surplus power. It is because power released from the computer is given to another computer based on the priority of the computer regardless of whether or not the power is actually required. Therefore, situations occur in which the power is not given to a computer requiring additional power, and in which the power is given to a computer not requiring the additional power.

It is a purpose of the present invention to accomplish an effective utilization of the surplus power.

According to the present invention, it is possible to effectively utilize the surplus power in the computer system configured including a plurality of computers.

1. First Exemplary Embodiment

Figure 1:
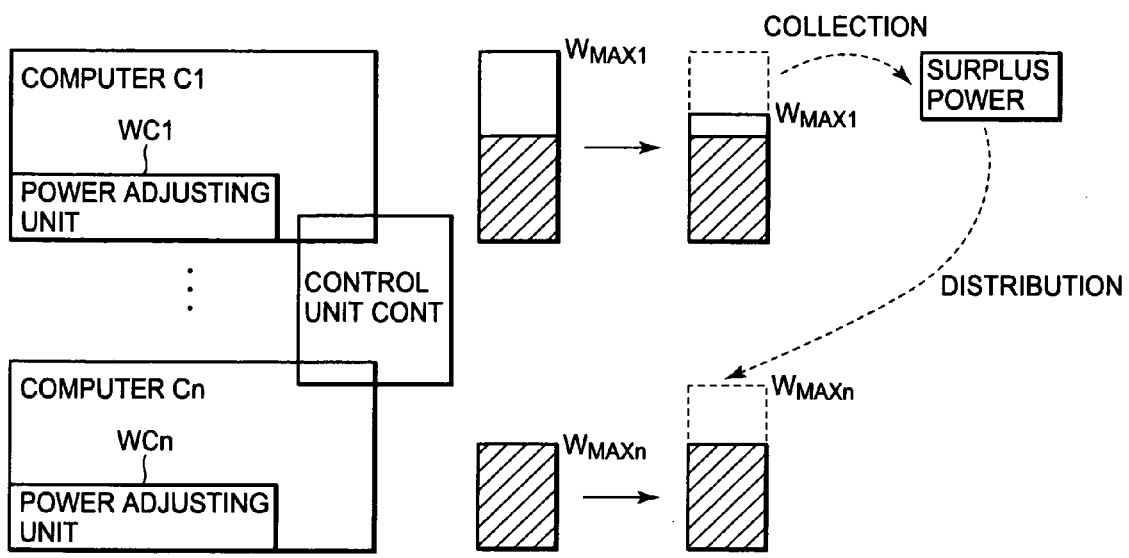
FIG. 1 is a block diagram of a first exemplary embodiment of the present invention.

With reference to FIG. 1, a power management system according to a first exemplary embodiment of the present invention includes a power adjusting unit (WC1 to WCn) provided in each of computers (C1 to Cn), and a control unit (CONT).

The power adjusting unit (WC1 to WCn) provided in each of the computers (C1 to Cn) adjusts a maximum power of each of the computers (C1 to Cn), so that the maximum power may not exceed maximum power consumption value ($W_{MAX1}$ to $W_{MAXn}$) set in each of the computers. As an example, the power adjusting unit (WC1 to WCn) may be implemented with means for changing maximum operating frequencies of processors included in the computers (C1 to Cn) to adjust power of the entire computers so that the power is held within (e.g., equal to or less) the maximum power consumption value ($W_{MAX1}$ to $W_{MAXn}$).

The control unit (CONT) includes a function of monitoring a state of power excess or shortage in the computers (C1 to Cn), and a function of increasing surplus power by reducing the maximum power consumption value of a computer including redundant power. Further, if any computer is short of power, the control unit (CONT) increases the maximum power consumption value of the computer which is short of power by an amount of the shortage on the condition that a total of the maximum power consumption value ($W_{MAX1}$ to $W_{MAXn}$) does not exceed an upper power limit value ($W_{GMAX}$) of the entire computer system. A remaining power obtained by subtracting the total of the maximum power consumption value ($W_{MAX1}$ to $W_{MAXn}$) from the upper power limit value ($W_{GMAX}$) becomes surplus power of the entire computer system.

A condition in which the redundant power in the computer C1 is recycled as the surplus power and distributed to the computer Cn requiring additional power, is shown in FIG. 1. A feature in which the recycled power has been maintained as the surplus power and the surplus power is provided to the computer Cn requiring the additional power, is different from the technique described in Patent Document 1. Thereby, it is possible to effectively utilize the surplus power in the computer system including a plurality of computers.

The functions included in the control unit (CONT) may be aggregated in one computer as a second exemplary embodiment described later, or may be distributed to each of the computers as a third exemplary embodiment described later.

Moreover, when the redundant power is recycled from the computers (C1 to Cn), if the recycling is performed so that at least a minimum power consumption value, which has been previously defined for each computer, remains, it is possible to guarantee a certain performance (power) for each computer. However, in order to further effectively utilize the surplus power, as the second and third exemplary embodiments, the power may be recycled as the surplus power even if the power of the computer may be under the minimum power consumption value. Further, if the power is required, the power is added to the computer requiring the additional power up to the minimum power consumption value even if the power of another computer is reduced.

2. Second Exemplary Embodiment

Figure 2:
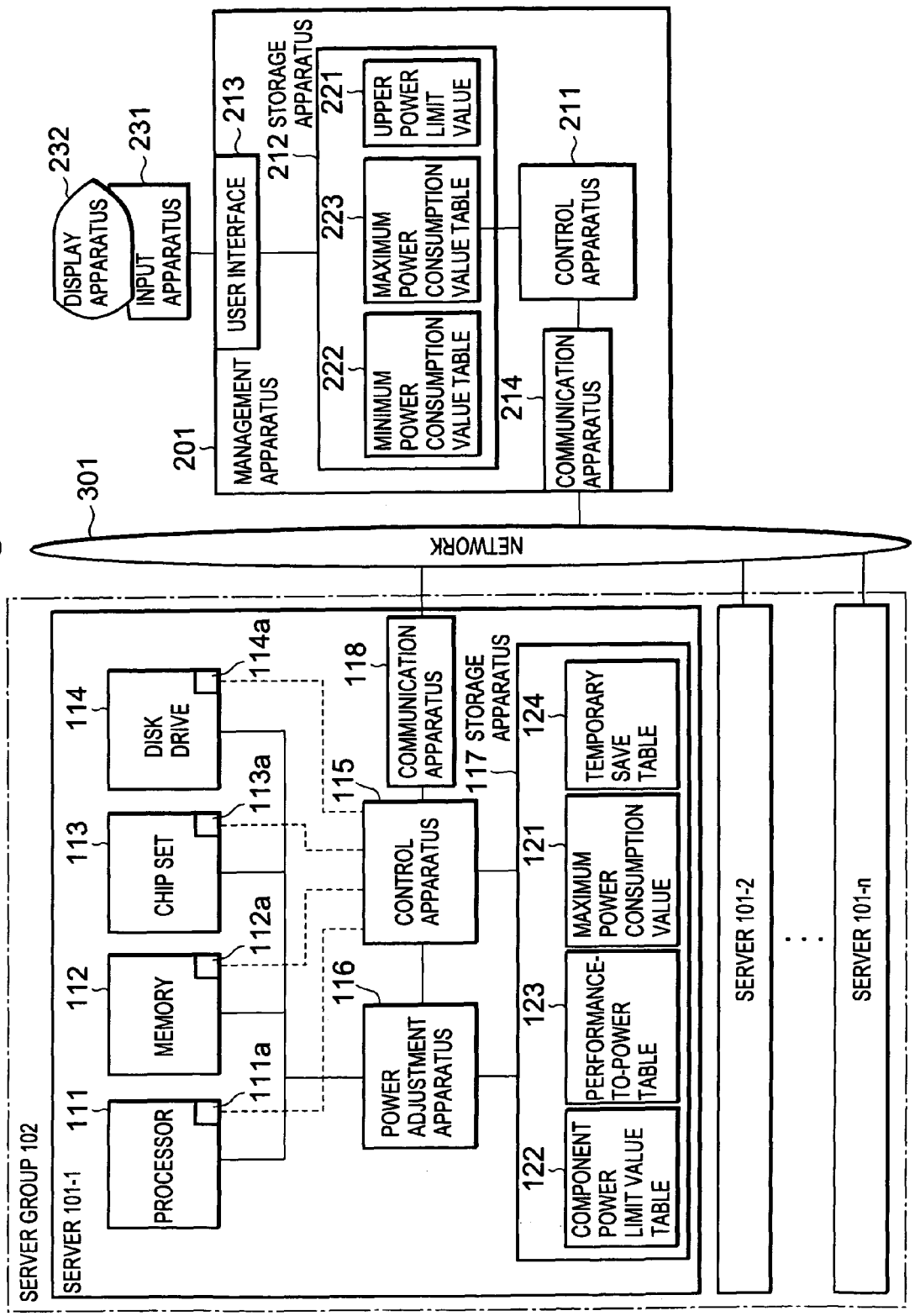
FIG. 2 is a block diagram of a second exemplary embodiment of the present invention.

With reference to FIG. 2, in a computer system according to the second exemplary embodiment of the present invention, a plurality of servers (hereinafter simply referred to as "servers") 101-1 to 101-$n$ and a management apparatus 201 are connected so that the servers (101-1 to 101-$n$) and the management apparatus 201 may be mutually communicated through a network 301 such as a LAN.

The management apparatus 201 may be an apparatus which manages the power of the multiple servers (101-1 to 101-$n$) and a server group 102, which is a group of the servers, and includes a control apparatus 211, a storage apparatus 212, a user interface 213 and a communication apparatus 214.

The storage apparatus 212 stores an upper power limit value 221, a minimum power consumption value table 222 and a maximum power consumption value table 223. The storage apparatus 212 may be referred to and updated from the control apparatus 211 and the user interface 213.

The upper power limit value 221 shows a value of maximum usable power in the entire server group 102, e.g., $W_{GMAX}$.

The minimum power consumption value table 222 may be a table which retains a value of minimum power guaranteed to be assigned to each of the respective servers (101-1 to 101-$n$). In the minimum power consumption value table 222, as shown in FIG. 3, in a manner corresponding to server identifiers for uniquely identifying the respective servers (101-1 to 101-$n$), the minimum power consumption values ($W_{MIN1}$ to $W_{MINn}$) of the servers have been stored. There is a limitation that a total of the minimum power consumption values ($W_{MIN1}$ to $W_{MINn}$) of the respective servers may be less than or equal to the upper power limit value 221.

The maximum power consumption value table 223 may be a table which retains a value of the maximum power consumption value currently assigned to each of the respective servers (101-1 to 101-$n$). In the maximum power consumption value table 223, as shown in FIG. 4, in a manner corresponding to the server identifiers for uniquely identifying the respective servers (101-1 to 101-$n$), the maximum power consumption value ($W_{MAX1}$ to $W_{MAXn}$) currently assigned to the servers may be stored. Since the maximum power consumption value ($W_{MAX1}$ to $W_{MAXn}$) of the respective servers is assigned within a range of the upper power limit value 221, a total of the maximum power consumption value ($W_{MAX1}$ to $W_{MAXn}$) becomes less than or equal to the upper power limit value 221. Moreover, remaining power obtained by subtracting the total of the maximum power consumption value ($W_{MAX1}$ to $W_{MAXn}$) from the upper power limit value 221 may be power which has not yet been assigned to any server, and may remain (e.g., be available) as surplus power of the entire server group 102.

Referring back to FIG. 2 and in response to an exemplary operation from a user input/output apparatus configured with an input apparatus 231 and a display apparatus 232, the user interface 213 displays contents of the upper power limit value 221, the minimum power consumption value table 222 and the maximum power consumption value table 223, which have been stored in the storage apparatus 212, on the display apparatus 232.

The user interface 213 also changes settings of the upper power limit value 221 and the minimum power consumption value table 222. When changing the settings of the upper power limit value 221 and the minimum power consumption value table 222, the user interface 213 limits input so that the total of the minimum power consumption values of the respective servers becomes less than or equal to the upper power limit value.

The communication apparatus 214 may be an apparatus for performing communication between the management apparatus 201 and the servers (101-1 to 101-$n$) through the network 301. Examples of main communication data formats transmitted between the management apparatus 201 and the servers (101-1 to 101-$n$) are shown in FIG. 5.

With reference to FIG. 5, power request communication data 311 may be communication data transmitted from the servers (101-1 to 101-$n$) requiring the additional power to the management apparatus 201, and is configured with a communication header 312 including a communicator address, a communication partner address or the like, an identifier 313 for identifying that a communication class is a power request, and an amount of additionally requested power 314.

The power request-response communication data 321 may be communication data transmitted from the management apparatus 201 to the servers (101-1 to 101-$n$) as a response to the power request communication data 311. Data 321 is configured with a communication header 322 including the communicator address, the communication partner address or the like, an identifier 323 for identifying that the communication class may be a response to the power request, and an amount of power permitted to be additionally secured 324. When the amount of the power permitted to be secured 324 may be a value of "0" for example, the above described power request-response communication data 321 becomes a rejection response for rejecting the power request, and when the amount of power permitted to be secured 324 may be a value other than "0", the above described power request-response communication data 321 becomes a permission response for example.

The power release notification communication data 331 may be communication data transmitted from the servers (101-1 to 101-$n$) releasing some of the power, to the management apparatus 201. Data 331 is configured with a communication header 332 including the communicator address, the communication partner address or the like, an identifier 333 for identifying that the communication class is a power release notification, and an amount of released power 334.

The power reduction request communication data 341 may be communication data transmitted from the management apparatus 201 to the servers (101-1 to 101-$n$) for forcibly securing the surplus power. Data 341 may be configured with a communication header 342 including the communicator address, the communication partner address or the like, an identifier 343 for identifying that the communication class may be a power reduction request, and an amount of forcibly reduced power 344.

The control apparatus 211 is an apparatus which mainly controls the management apparatus 201, and may be connected to the storage apparatus 212 and the communication apparatus 214. When the control apparatus 211 receives the power release notification communication data 331 through the communication apparatus 214 from any of the servers (101-1 to 101-$n$), the control apparatus 211 performs a process of reducing current maximum power consumption value of the above described server, which has been recorded in the maximum power consumption value table 223, by the power release amount 334. This reduction process increases the surplus power of the entire server group 102 by the power release amount 334.

Moreover, when the control apparatus 211 receives the power request communication data 311 through the communication apparatus 214 from any of the servers (101-1 to 101-$n$), if there is a margin of the surplus power, then the control apparatus 211 distributes the power from the surplus power. If there is no margin of the surplus power, then the control apparatus 211 performs a process of collecting all or some of power exceeding the minimum power consumption value as the surplus power by transmitting the power reduction request communication data 341 with respect to another server securing power more than or equal to the minimum power consumption value, if necessary, on the condition that current maximum power consumption value of the server requesting for the additional power may be less than the minimum power consumption value of the server, and subsequently distributing the power to the server requesting for the additional power.

On the other hand, the server 101-1 may be provided with a processor 111, a memory 112, a chip set 113, a disk drive 114, a control apparatus 115, a power adjustment apparatus 116, a storage apparatus 117 and a communication apparatus 118. The processor 111, the memory 112, the chip set 113 and the disk drive 114 may be components which may be typically provided in a computer.

On the other hand, the control apparatus 115, the power adjustment apparatus 116, the storage apparatus 117 and the communication apparatus 118 may be provided for managing the power of the server 101-1. Moreover, the processor 111, the memory 112, the chip set 113 and the disk drive 114 may be attached with power sensors 111a to 114a for measuring actual power, respectively.

In the storage apparatus 117, a maximum power consumption value 121, a component power limit value table 122, a performance-to-power table 123 and a temporary save table 124 have been stored. The storage apparatus 117 may be referred to from the power adjustment apparatus 116, and may be referred to and updated from the control apparatus 115.

The maximum power consumption value 121 shows the value of the maximum power consumption value currently assigned to the server 101-1.

The component power limit value table 122 may be a table which stores a component power limit value which is currently set with respect to a power-adjustable component. In the case of this exemplary embodiment, four components of the processor 111, the memory 112, the chip set 113 and the disk drive 114 are power-adjustable components, for example. As shown in FIG. 6, in the component power limit value table 122, in a manner corresponding to identifiers for uniquely identifying the respective power-adjustable components, their component power limit values $W_{CPU}$, $W_{MEM}$, $W_{CIP}$ and $W_{DISK}$ have been retained.

The performance-to-power table 123 may be a table in which a relationship between performance and the power has been described, showing how the performance of the power-adjustable component may be adjusted in order to reduce the maximum power of the component to a certain value. Typically, with respect to the processor 111, the memory 116 and the chip set 113, if the operating frequency is increased, power consumption is increased, and if the operating frequency is decreased, the power consumption is decreased. Therefore, the maximum power consumption may be adjusted by limiting a maximum operating frequency. It should be noted that, typically, since a higher operating frequency requires a higher voltage, if the maximum operating frequency is changed, it may be necessary to adjust the voltage. Moreover, with respect to the disk drive 114, the maximum power consumption may be adjusted by changing a disk rotation number. Furthermore, in the case of a component such as a communication card, which although may be not included in the power-adjustable components in this exemplary embodiment, its power consumption may be adjusted by narrowing or widening an I/O access band. The performance-to-power table 123 may be provided in a manner corresponding to each power-adjustable component, and describes the relationship between the performance and the power in the corresponding component.

Figure 7:
FIG. 7 is a diagram showing an example of a performance-to-power table 123 used in the second exemplary embodiment of the present invention.

An example of the performance-to-power table 123 is shown in FIG. 7. This example may be a table for the processor 111, and a correspondence relationship between the maximum frequency and the maximum power in the processor 111, showing that if the maximum operating frequency is held down to 100 MHz, 80 MHz, 60 MHz, . . . , the maximum power consumption is held down to 50 W, 40 W, 30 W, . . . , is described.

Figure 8:
FIG. 8 is a diagram showing an example of a temporary save table 124 used in the second exemplary embodiment of the present invention.

The temporary save table 124 may be a table used in a periodic monitoring process with respect to the power-adjustable components. With reference to FIG. 8, in the temporary save table 124, a component identifier, a new component power limit value determined by the monitoring process, and excess or shortage power which is a difference between the new component power limit value and a current component power limit value, are stored for each power-adjustable component.

The power adjustment apparatus 116 adjusts the performance of each power-adjustable component so that the maximum power of the component may not exceed the component power limit value set in the component power limit value table 122, with reference to the performance-to-power table 123. Specifically, as described above, with respect to the processor 111, the memory 112 and the chip set 113, for example, the maximum operating frequency is adjusted, and with respect to the disk drive 114, for example, its rotation number is adjusted.

The communication apparatus 118 may be an apparatus for communicating the communication data as illustrated in FIG. 5 between the server 101-1 and the management apparatus 201, through the network 301.

The control apparatus 115 may be an apparatus which performs power management of the server 101-1, and may be connected to the power sensors 111a to 114a, the power adjustment apparatus 116, the communication apparatus 118 and the storage apparatus 117. The control apparatus 115 includes a function of adjusting the maximum power of each of the components 111 to 114 by using the power adjustment apparatus 116 so that the maximum power consumption of the server 101-1 may not exceed the maximum power consumption value 121.

Moreover, the control apparatus 115 includes a function of determining a state of power excess or shortage in each of the components 111 to 114 based on the actual power measured by the power sensors 111a to 114a. If there is redundant power, then control apparatus 115 releases some of the power secured in the server 101-1 to the management apparatus 201 by using the power release notification communication data 331. Conversely, if there is power shortage, then the control apparatus 115 requests the management apparatus 201 for the additional power by using the power request communication data 311. Furthermore, the control apparatus 115 includes a function of, if the control apparatus 115 has received the power reduction request communication data 341 from the management apparatus 201, reducing some of the secured power.

Other servers (101-2 to 101-n) include the same configuration and functions as the server 101-1.

Next, exemplary operations of this exemplary embodiment will be described.

First, an exemplary operation of controlling the maximum power consumption of each of the servers 101-1 to 101-n so that the maximum power consumption may not exceed the maximum power consumption value 121 set in the server will be described.

If it is assumed that a value of the maximum power consumption value 121 of the server 101-1 is $W_{MAX1}$, then a total of the maximum power of the power-adjustable components 111 to 114 among the components configuring the server 101-1 is $W_S$, and a total of the maximum power of other non-power-adjustable components such as the communication apparatus 118 is $W_O$, the maximum power of the server 101-1 is $W_S+W_O$, and $W_O$ is uncontrollable. Therefore, in order to achieve $W_S+W_O<W_{MAX1}$, the maximum power consumption of the components 111 to 114 may be limited so that $W_S<(W_{MAX1}-W_O)$ is achieved. Consequently, the control apparatus 115 determines the maximum power consumption value of the processor 111, $W_{CPU}$, the maximum power consumption value of the memory 112, $W_{MEM}$, the maximum power consumption value of the chip set 113, $W_{CIP}$, and the maximum power consumption value of the disk drive 114, $W_{DISK}$, so that a total of $W_{CPU}$, $W_{MEM}$, $W_{CIP}$ and $W_{DISK}$ becomes less than or equal to $(W_{MAX1}-W_O)$.

As a method of determining how to allocate the power less than or equal to $(W_{MAX1}-W_O)$ to $W_{CPU}$, $W_{MEM}$, $W_{CIP}$ and $W_{DISK}$, for example, there may be a method of storing a table in which optimum assignment amounts for $W_{CPU}$, $W_{MEM}$, $W_{CIP}$ and $W_{DISK}$ have been previously set for each value range of $(W_{MAX1}-W_O)$, in the storage apparatus 117, and performing the determination with reference to the table. Moreover, a combination of the assignment amounts which may be considered to include a highest performance may be estimated and obtained as appropriate.

As shown in FIG. 6, the control apparatus 115 stores the determined $W_{CPU}$, $W_{MEM}$, $W_{CIP}$ and $W_{DISK}$ in the component power limit value table 122 in the storage apparatus 117, and instructs the power adjustment apparatus 116 to perform the adjustment. For each of the components 111 to 114, the power adjustment apparatus 116 reads the component power limit value from the component power limit value table 122, reads performance information corresponding to the component power limit value from the performance-to-power table 123, and adjusts the performance of the component so that the performance may match this read performance information. For example, in the case of the processor 111, the maximum operating frequency corresponding to the component power limit value $W_{CPU}$ may be obtained from the performance-to-power table 123 shown in FIG. 7, and the operating frequency of the processor 111 is adjusted so that the operating frequency may become the above described obtained maximum operating frequency. If there is no completely matching component power limit value in the table, then it may be determined by an interpolation calculation from previous and subsequent values.

As a result of the above described control, the maximum power consumption of the server 101-1 may be kept within a range of the maximum power consumption value 121. Also with respect to the servers 101-2 to 101-$n$ other than the server 101-1, similarly, the maximum power consumption of those servers may be held within a range of the maximum power consumption value $W_{MAX2}$ to $W_{MAXn}$ given as the maximum power consumption values 121 with respect to those servers. Then, since the total of the maximum power consumption values of the respective servers (101-1 to 101-$n$) may be controlled so as not to exceed the upper power limit value 221 as described later, the maximum power consumption of the entire server group 102 can be held within the range of the upper power limit value 221.

Next, an exemplary operation of monitoring the actual power of the servers (101-1 to 101-$n$) being operated, and based on a result of the monitoring, dynamically releasing some of the power of each server or adding the power to the server, will be described.

Figure 9:
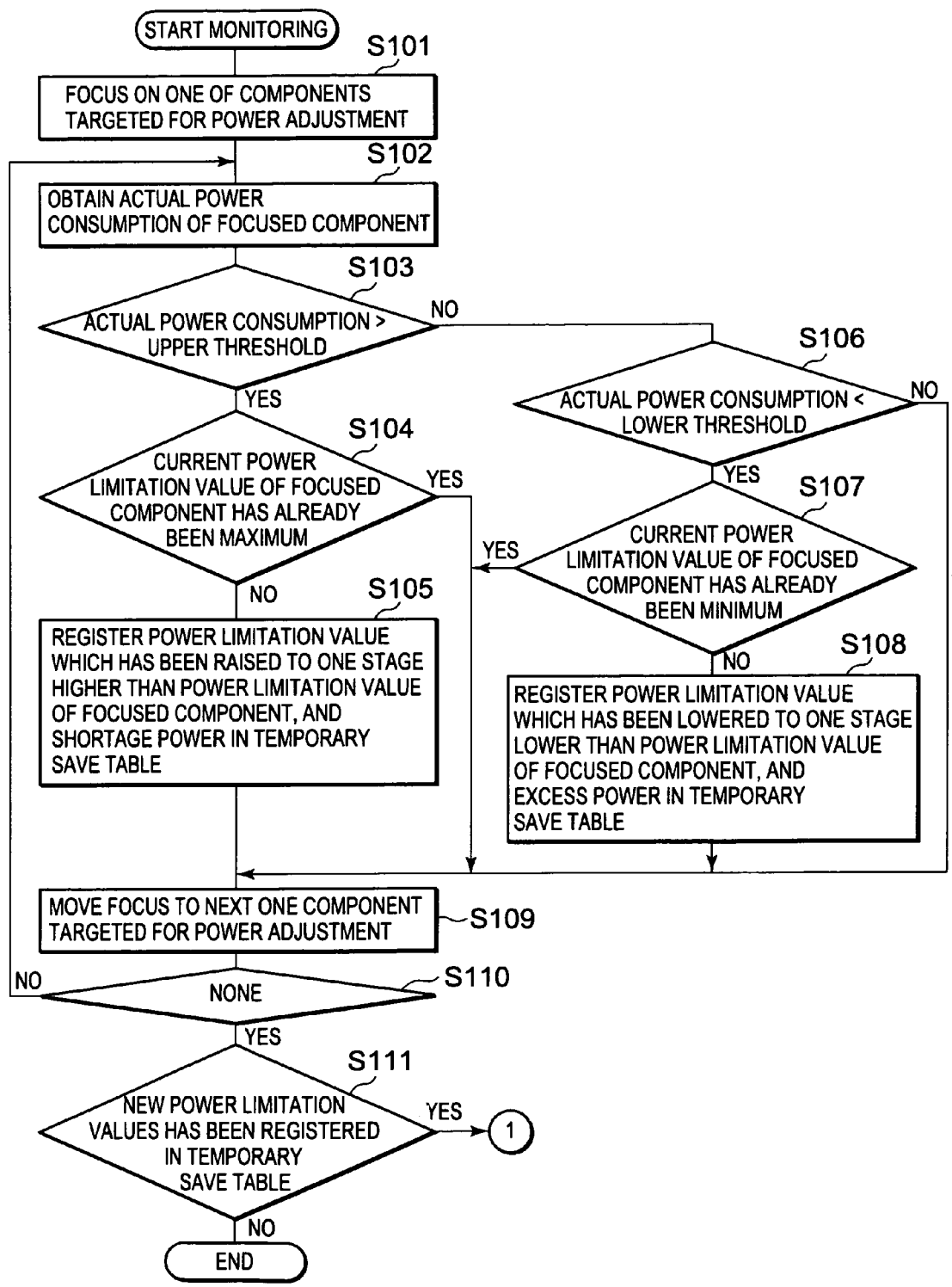
FIG. 9 is a flowchart showing an example of a monitoring process performed by a control apparatus of a server, in the second exemplary embodiment of the present invention.

The control apparatus 115 of the server 101-1 periodically executes a monitoring process shown in FIG. 9. First, the process is focused on one component among components targeted for power adjustment, for example, the processor 111 (S101). Next, actual power consumption of the processor 111 may be obtained from the power sensor 111$a$ (S102). The actual power consumption may be instantaneous power, or may be a maximum value or an average value in a certain past time period.

Next, the actual power consumption may be compared with an upper threshold of the processor which is the focused component (S103). The upper threshold may be set to, for example, a value of 90% of a current component power limit value of the processor 111, $W_{CPU}$, stored in the component power limit value table 122.

However, if the actual power consumption is beyond the upper threshold (YES at S103), then it is examined whether or not the current component power limit value of the processor 111 has already become maximum, with reference to the performance-to-power table 123 (S104). If the current component power limit value of the processor 111 has already become maximum, since further addition of the power cannot be performed, then the process is advanced to step S109.

If the current component power limit value of the processor 111 has not yet become maximum, then a component power limit value which is one stage higher than the current component power limit value is obtained with reference to the performance-to-power table 123, this obtained component power limit value is stored in a field of the new component power limit value corresponding to the processor 111 in the temporary save table 124, and also the difference between this new component power limit value and the current component power limit value is stored as shortage power in a field of the excess or shortage power corresponding to the processor 111 in the temporary save table 124 (S105). Then, the process is advanced to step S109.

Moreover, if the actual power consumption of the processor 111 is not beyond the upper threshold (NO at S103), then the actual power consumption is compared with a lower threshold of the processor which is the focused component (S106) The lower threshold is set to, for example, a value of 70% of the current component power limit value of the processor 111, $W_{CPU}$, stored in the component power limit value table 122.

However, if the actual power consumption is lower than the lower threshold (YES at S106), then it is examined whether or not the current component power limit value of the processor 111 has already become minimum, with reference to the performance-to-power table 123 (S107). If the current component power limit value of the processor 111 has already become minimum, since further release of the power cannot be performed, then the process is advanced to step S109. If the current component power limit value of the processor 111 has not yet become minimum, then a component power limit value which is one stage lower than the current component power limit value is obtained with reference to the performance-to-power table 123, this obtained component power limit value is stored in the field of the new component power limit value corresponding to the processor 111 in the temporary save table 124, and also the difference between the current component power limit value and the new component power limit value is stored as excess power in the field of the excess or shortage power corresponding to the processor 111 in the temporary save table 124 (S108). Then, the process is advanced to step S109.

Moreover, if a result of the determination at step S106 is NO, that is, if the actual power consumption of the processor 111 is between the lower threshold and the upper threshold, then it is determined that the change of the component power limit value with respect to the processor 111 is not necessary, and the process is advanced to step S109.

At step S109, the focus is moved to a next component targeted for power adjustment, for example, the memory 112, and the processes at steps S102 to S108 are repeated. Similarly, also with respect to the chip set 113 and the disk drive 114 which are remaining components targeted for power adjustment, the processes at steps S102 to S108 are repeated.

Then, when the process with respect to all components targeted for power adjustment has been completed (YES at S110), it is determined whether or not at least one new component power limit value has been registered in the temporary save table 124 (S111), and if not any one new component power limit value has been registered, the monitoring process of this time is completed. If at least one new component power limit value has been registered, then the process proceeds to a process of FIG. 10.

Figure 10:
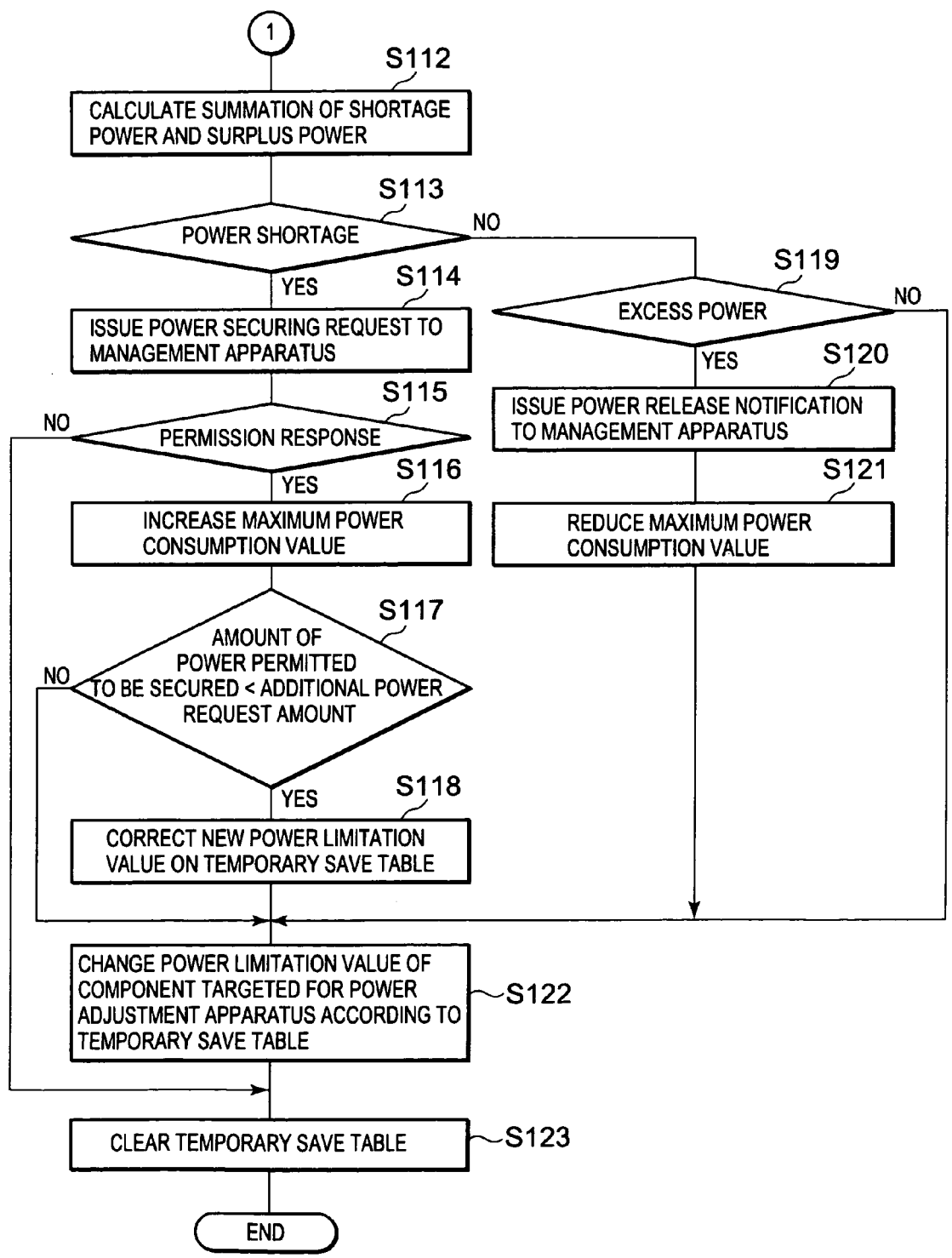
FIG. 10 is a flowchart showing an example of the monitoring process performed by the control apparatus of the server, in the second exemplary embodiment of the present invention.

In the process of FIG. 10, first, the control apparatus 115 calculates a total (e.g., summation) of the excess or shortage power registered in the temporary save table 124 (S112). If it is assumed that the surplus power is a positive value and the shortage power is a negative value, when the total is the positive value, then it means that there is redundant power as a whole. When the total is a negative value, it may mean that there is a power shortage as a whole, and when the total is 0, it may mean that offset has been achieved.

If there is the power shortage (YES at S113), then the control apparatus 115 transmits the power request communication data 311 in which a shortage power value has been set in the additional power request amount 314, through the communication apparatus 118 to the management apparatus 201 (S114). Then, when the power request-response communication data 321 is received from the management apparatus 201, the additional power request amount 314 in the communication data 321 is examined. If the additional power request amount 314 is larger than 0, it may be determined as a permission response. If the additional power request amount 314 is 0, it may be determined as a rejection response (S115).

In the case of the permission response (YES at S115), the control apparatus 115 first increases the maximum power consumption value 121 by the amount of power permitted to be secured 324 (S116).

Next, the additional power request amount 314 requested with the power request communication data 311 and the amount of power permitted to be secured 324 notified with the power request-response communication data 321 are compared. If the amount of power permitted to be secured 324 is smaller than the additional power request amount 314 (YES at S117), then the new component power limit value is corrected so that a total of the new component power limit value stored in the temporary save table 124 is reduced by a difference between the additional power request amount 314 and the amount of power permitted to be secured 324 (S118). At this time, if the new component power limit values of multiple components targeted for power adjustment have been stored in the temporary save table 124, then which new component power limit value is corrected is arbitrary, and all may be corrected by the same amount, or the new component power limit value of a low priority component may be preferentially corrected based on predetermined priorities among the components. Then, the process is advanced to step S122.

Moreover, in the case of the rejection response (NO at S115), the control apparatus 115 clears the fields of the new component power limit value and the excess or shortage power in the temporary save table 124 to empty (S123), and completes the monitoring process at this time.

On the other hand, if there is excess power (YES at S119), then the control apparatus 115 transmits the power release notification communication data 331 in which an excess power value has been set in the power release amount 334, through the communication apparatus 118 to the management apparatus 201 (S120). Then, the maximum power consumption value 121 is reduced by the power release amount 334 (S121), and the process is advanced to step S122.

Moreover, if there is no power shortage or excess and an excess or shortage voltage has been offset (NO at S119), the process is advanced to step S122.

At step S122, according to the temporary save table 124, the control apparatus 115 changes the component power limit value of the component targeted for power adjustment with the power adjustment apparatus 116. For example, if $W_{NCPU}$ has been stored as the new component power limit value of the processor in the temporary save table 124, and the fields of the new component power limit value corresponding to the memory, the chip set and the disk drive have been empty, the control apparatus 115 rewrites the component power limit value of the processor, $W_{CPU}$, in the component power limit value table 122 with the new component power limit value $W_{NCPU}$, and notifies that the component power limit value of the processor 111 has been changed, with respect to the power adjustment apparatus 116.

The power adjustment apparatus 116 reads the new component power limit value of the processor 111, $W_{NCPU}$, from the component power limit value table 122, reads the performance information corresponding to the component power limit value $W_{NCPU}$ from the performance-to-power table 123, and adjusts the operating frequency of the processor 111 so that the operating frequency matches this read performance information.

When the control apparatus 115 completes the process of changing the component power limit value according to the temporary save table 124, the control apparatus 115 clears the fields of the new component power limit value and the excess or shortage power in the temporary save table 124 to empty (S123), and completes the monitoring process at this time.

Also, the servers (101-2 to 101-$n$) other than the server 101-1 periodically execute the monitoring process shown in FIGS. 9 and 10, similarly to the server 101-1.

Next, a process in the management apparatus 201 which has received the power release notification communication data 331 transmitted from the server 101-1 at step S120 of FIG. 10 will be described.

Figure 11:
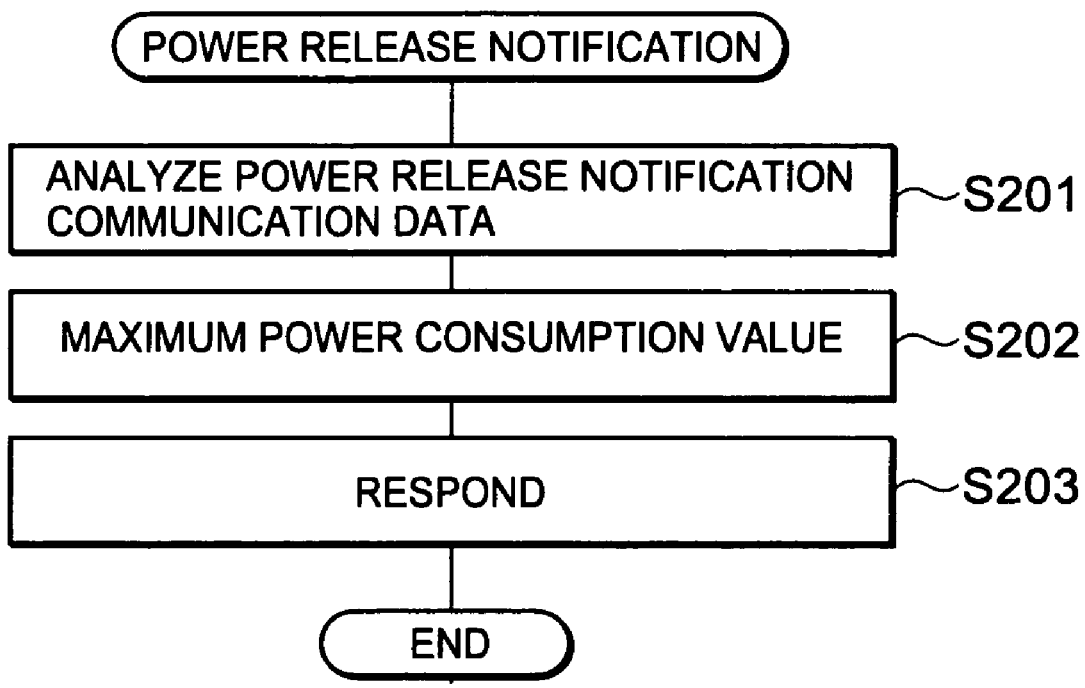
FIG. 11 is a flowchart showing an example of a process performed by a management apparatus when the management apparatus has received a power release notification from the server, in the second exemplary embodiment of the present invention.

With reference to FIG. 11, when the control apparatus 211 of the management apparatus 201 receives the power release notification communication data 331 transmitted from the server 101-1, through the communication apparatus 214, the control apparatus 211 analyzes the communication data 331, and recognizes that it is the power release notification from a result of analyzing the identifier 333, that a power release side is the server 101-1 from information on the communicator in the header 332, and the amount of the released power from the power release amount 334, respectively (S201).

Next, the control apparatus 211 reads the current maximum power consumption value of the server 101-1 from the maximum power consumption value table 223, adds the amount of power released at this time to this read value, and writes a result of this addition as the maximum power consumption value of the server 101-1, back to the maximum power consumption value table 223 (S202). Then, communication data for responding that the power release notification communication data 331 has been received and processed is transmitted to the server 101-1 (S203), and the process is completed.

Next, a process in the management apparatus 201 which has received the power request communication data 311 transmitted from the server 101-1 at step S114 of FIG. 10 will be described.

Figure 12:
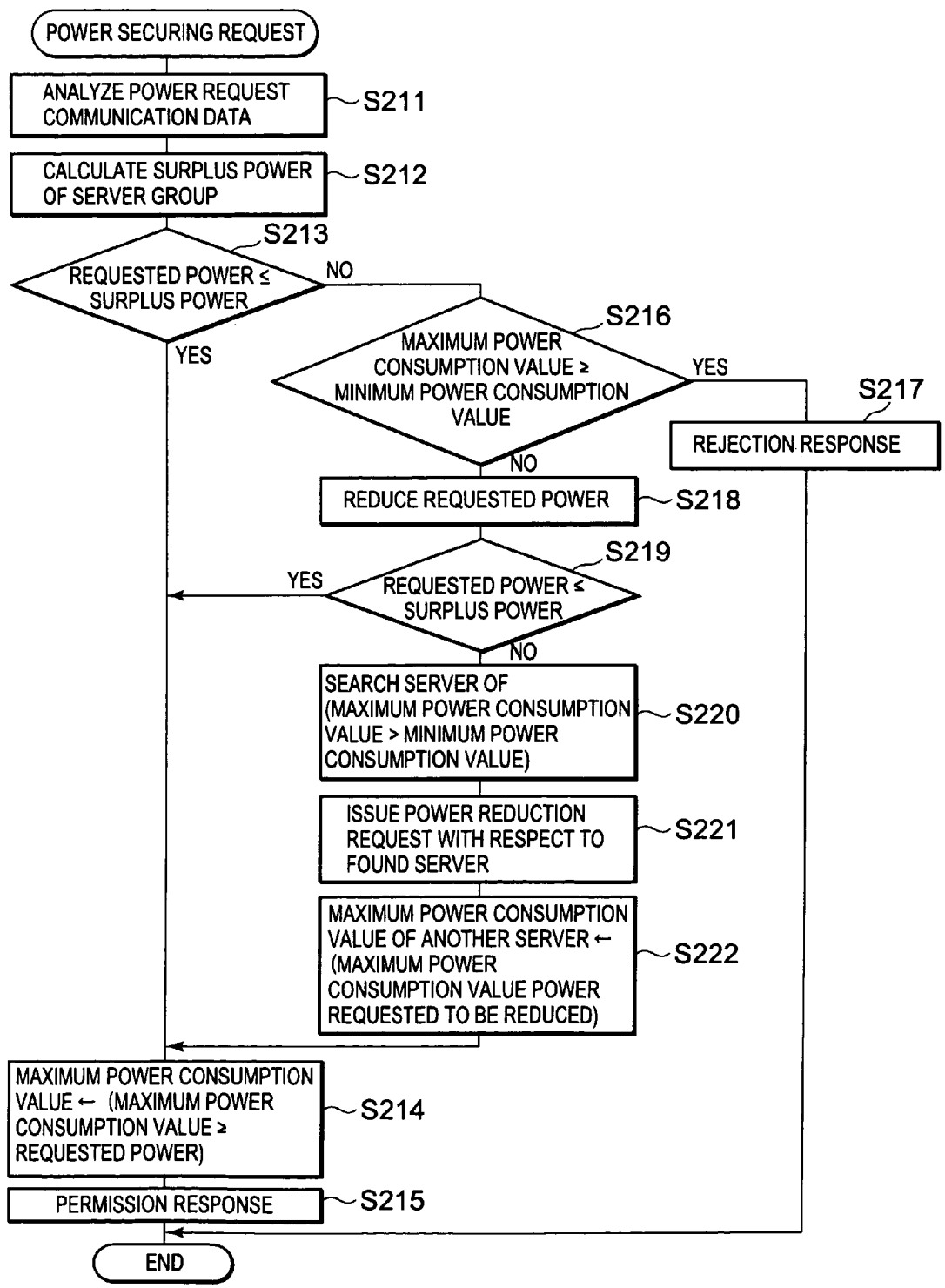
FIG. 12 is a flowchart showing an example of a power securing process performed by the management apparatus with respect to the server, in the second exemplary embodiment of the present invention.

With reference to FIG. 12, when the control apparatus 211 of the management apparatus 201 receives the power request communication data 311 transmitted from the server 101-1, through the communication apparatus 214, the control apparatus 211 analyzes the communication data 311, and recognizes that it is the power request from a result of analyzing the identifier 313, that a power requester is the server 101-1 from information on the communicator in the header 312, and the amount of the requested power from the additional power request amount 314, respectively (S211).

Next, the control apparatus 211 subtracts a total of the current maximum power consumption value of each of the servers (101-1 to 101-n) recorded in the maximum power consumption value table 223 from the upper power limit value 221, and thereby calculates current surplus power (S212), and compares it with the requested power (S213).

If the surplus power is more than or equal to the requested power (YES at S213), then since the surplus power can be applied, the current maximum power consumption value of the server 101-1 is read from the maximum power consumption value table 223, the amount of power requested at this time is added to this read value, and a result of this addition is written as the maximum power consumption value of the server 101-1, back to the maximum power consumption value table 223 (S214). Then, the power request-response communication data 321 in which the amount of power requested at this time has been written in the amount of power permitted to be secured 324 is transmitted to the server 101-1 through the communication apparatus 214 (S215), and the process is completed.

On the other hand, if the surplus power is less than the requested power (NO at S213), then the control apparatus 211 reads the current maximum power consumption value and the minimum power consumption value of the server 101-1 which is the power requester, from the maximum power consumption value table 224 and the minimum power consumption value table 222, and compares them (S216). If the maximum power consumption value is more than or equal to the minimum power consumption value, since further addition of the power is not required to be guaranteed under the condition where there is no margin of the surplus power, then the control apparatus 211 transmits the power request-response communication data 321 in which "0" may have been written in the amount of power permitted to be secured 324, to the server 101-1 through the communication apparatus 214 (S217), and completes the process.

However, if the current maximum power consumption value of the server 101-1 which is the power requester is less than the minimum power consumption value (NO at S216), then the control apparatus 211 executes the following process in order to guarantee the power up to the minimum power consumption value.

First, the control apparatus 211 reduces the requested power of the server 101-1 to remaining power obtained by subtracting the maximum power consumption value from the minimum power consumption value of the server 101-1 (S218). Next, the reduced requested power and the surplus power of the entire server group are compared (S219).

If the surplus power is more than or equal to the requested power (YES at S219), since the surplus power may be applied, then the amount of the requested power is added to the current maximum power consumption value of the server 101-1 in the maximum power consumption value table 223 (S214), the power request-response communication data 321 (S215), in which the amount of power permitted to be secured has been written in the amount of power permitted to be secured 324 is transmitted to the server 101-1 through the communication apparatus 214 (S215), and the process is completed.

If the surplus power is less than the requested power (NO at S219), then the control apparatus 115 searches another server securing the maximum power consumption value exceeding the minimum power consumption value from the minimum power consumption value table 222 and the maximum power consumption value table 223 (S220).

Next, in order to newly secure power of an amount which is insufficient with the surplus power, from another server which has been found in this search, the power reduction request is issued with the power reduction request communication data 341 (S221). In the case where multiple other servers have been found, with respect to how much power reduction request is issued to which other server, various methods are conceivable.

For example, the power reduction request may be issued to all other found servers. In this case, the power reduction request amount for each server may be equal, or the power reduction request amount may be larger for the server having a larger difference between the maximum power consumption value and the minimum power consumption value. Moreover, in consideration of a priority granted to each server, whether or not there is the power reduction request, and an amount of the reduction may be controlled.

Next, with respect to another server to which the power reduction request has been issued, the maximum power consumption value is reduced by the reduction request amount (S222).

Specifically, the current secured value of the server to which the power reduction request has been issued is read from the maximum power consumption value table 223, the amount of power requested to be reduced at this time is subtracted from this read value, and a result of this subtraction is written as the maximum power consumption value of the server, back to the maximum power consumption value table 223. Then, the process proceeds to a process at step S214, and the amount of the requested power is added to the current maximum power consumption value of the server 101-1 in the maximum power consumption value table 223. Then, the power request-response communication data 321 in which the amount of power permitted to be secured has been written in the amount of power permitted to be secured 324 is transmitted to the server 101-1 through the communication apparatus 214 (S215), and the process is completed.

Next, exemplary operations of the servers (101-1 to 101-n) which have received the power reduction request communication data 341 issued at step S221 of FIG. 12 will be described with an example of the server 101-1.

Figure 13:
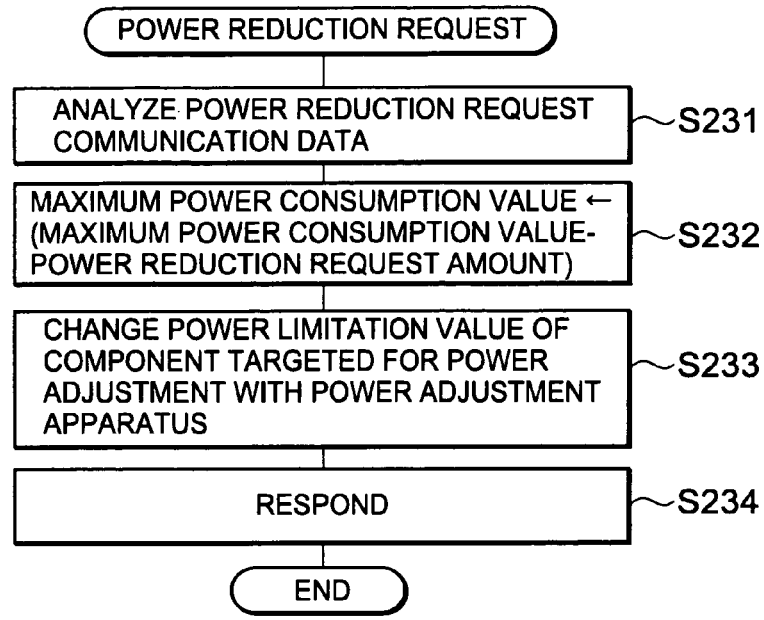
FIG. 13 is a flowchart showing an example of a process performed by the server when the server has received a power reduction request from the management apparatus, in the second exemplary embodiment of the present invention.

With reference to FIG. 13, when the control apparatus 115 of the server 101-1 receives the power reduction request communication data 341 transmitted from the management apparatus 201, through the communication apparatus 118, the control apparatus 115 analyzes the communication data 341, and recognizes that it is the power reduction request from a result of analyzing the identifier 343, and the requested power reduction amount from the power reduction request amount 344, respectively (S231).

Next, the control apparatus 115 reads the maximum power consumption value 121 from the storage apparatus 117, subtracts the power reduction amount requested at this time from this read value, and writes a result of this subtraction as a new maximum power consumption value 121, back to the storage apparatus 117 (S232).

Next, according to the power reduction amount at this time, the control apparatus 115 changes the component power limit value of the component targeted for power adjustment with the power adjustment apparatus 116 (S233).

Specifically, if it is assumed that the maximum power consumption value 121 from which the power has been reduced is $W_{MAX1}$, then similarly to the above described method, the control apparatus 115 determines the maximum power consumption value of the processor 111, $W_{CPU}$, the maximum power consumption value of the memory 112, $W_{MEM}$, the maximum power consumption value of the chip set 113, $W_{CIP}$, and the maximum power consumption value of the disk drive 114, $W_{DISK}$, so that the total of $W_{CPU}$, $W_{MEM}$, $W_{CIP}$ and $W_{DISK}$ becomes less than or equal to ($W_{MAX1}-W_0$). A fact that the component power limit value of the component targeted for power adjustment has been changed is notified from the control apparatus 115 to the power adjustment apparatus 116. The power adjustment apparatus 116 reads the new component power limit value of each component targeted for power adjustment from the component power limit value table 122, reads the performance information corresponding to the component power limit value from the performance-to-power table 123, and adjusts the performance of each component targeted for power adjustment so that the performance matches this read performance information. Finally, the control apparatus 115 transmits communication data which is a response to the power reduction request communication data, to the management apparatus 201 (S234), and completes the process.

Figure 14:
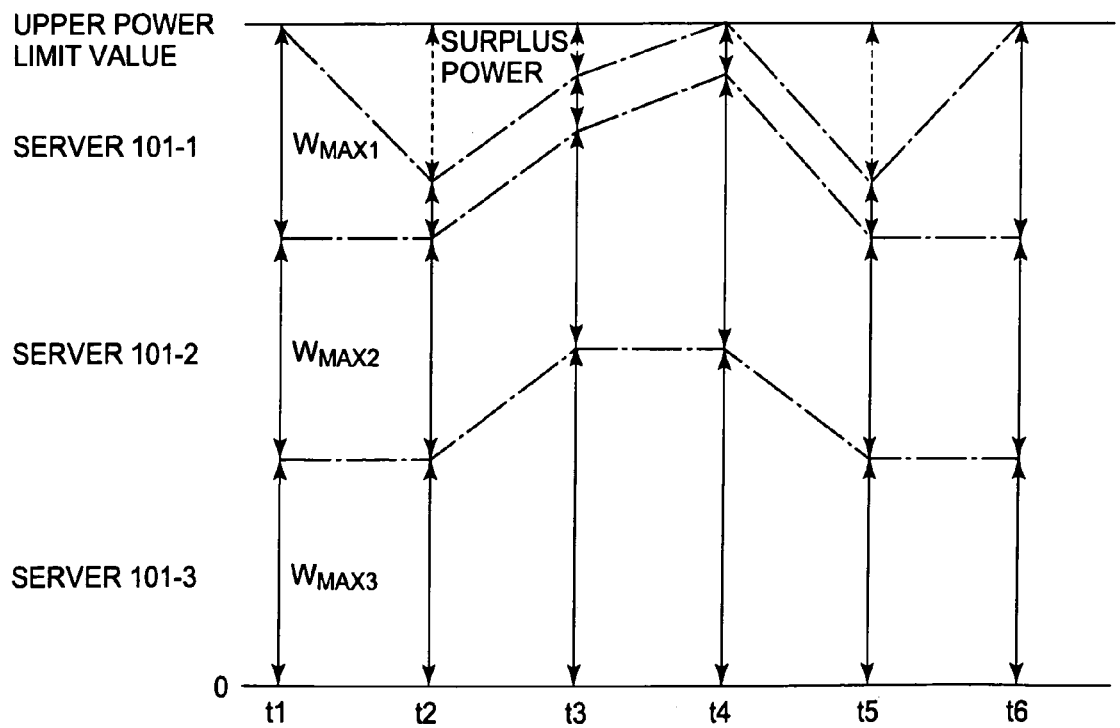
FIG. 14 is a diagram showing a transition of maximum power consumption value of each server in the second exemplary embodiment of the present invention.

Next, it is assumed that the number of servers (101-1 to 101-n) is "3" (that is, n=3), and the exemplary operations of this exemplary embodiment will be described with reference to FIG. 14 showing transition of the maximum power consumption value of each server. It is presupposed that a total of the minimum power consumption values of the servers (101-1 to 101-3), $W_{MIN1}$, $W_{MIN2}$ and $W_{MIN3}$, is equal to the upper power limit value 221.

With reference to FIG. 14, at time t1, the maximum power consumption value $W_{MAX1}$, $W_{MAX2}$ and $W_{MAX3}$ equal to the minimum power consumption values $W_{MIN1}$, $W_{MIN2}$ and $W_{MIN3}$ has been secured in the respective servers (101-1 to 101-3). Under this condition, if the server 101-1 has released some of the redundant power, then the maximum power consumption value of the server 101-1, $W_{MAX1}$, is reduced, and an amount of the reduction is managed as the surplus power of the server group 102, as shown at time t2.

Next, under the condition at time t2, if the power is requested from the server 101-3, the surplus power is applied, and as shown at time t3, the maximum power consumption value of the server 101-3, $W_{MAX3}$, is increased by an amount of the request. Similarly, if the power is also requested from the server 101-2, the surplus power is applied, and as shown at time t4, the maximum power consumption value of the server 101-2, $W_{MAX2}$, is increased by the amount of the request. At this point, the surplus power has become "0".

Subsequently, it is assumed that, since the power shortage has occurred in the server 101-1, under the condition shown at time t4, the power request has been issued from the server 101-1. In this case, since the surplus power is "0", the surplus power cannot be applied. However, since the current maximum power consumption value of the server 101-1, $W_{MAX1}$, is smaller than the minimum power consumption value $W_{MIN1}$, it is necessary to guarantee the minimum power consumption value $W_{MIN1}$ even by robbing other servers 101-2 and 101-3 of the power.

Consequently, first, an amount of power exceeding the minimum power consumption values $W_{MIN2}$ and $W_{MIN3}$ may be caused to be released by issuing the power reduction request with respect to the servers 101-2 and 101-3. Thereby, the surplus power is secured as shown at time t5. Next, the additional power is distributed from this surplus power with respect to the server 101-1. As a result of this, as shown at time t6, the maximum power consumption value of the server 101-1, $W_{MAX1}$, immediately recovers up to the minimum power consumption value $W_{MIN1}$, and a minimum performance is guaranteed. Moreover, also in the servers 101-2 and 101-3, since the maximum power consumption value $W_{MAX2}$ and $W_{MAX3}$ is not reduced to be less than or equal to the minimum power consumption values $W_{MIN2}$ and $W_{MIN3}$, the minimum performance is guaranteed.

Figure 15:
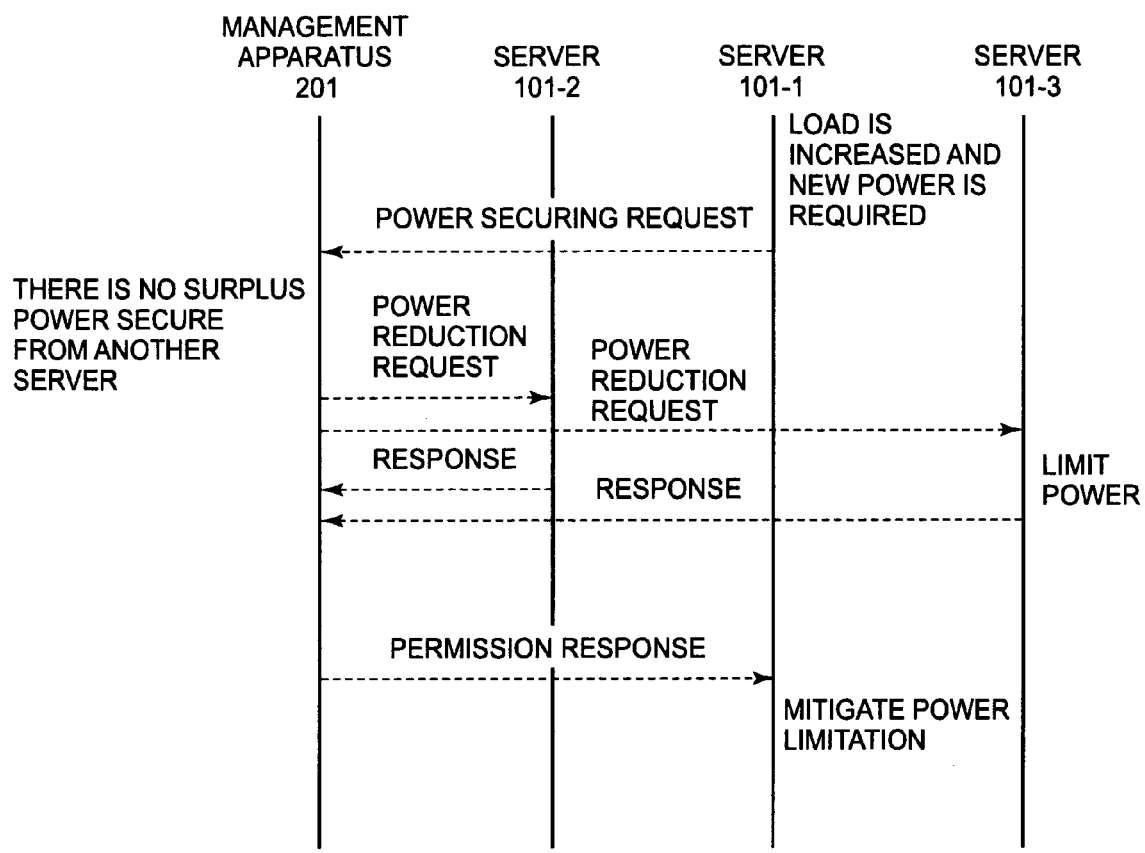
FIG. 15 is a diagram showing a sequence of requests and the like exchanged between each server and the management apparatus from when a load has been increased and new power has been required in one server until when additional power is secured and a component power limit is mitigated, in the second exemplary embodiment of the present invention.

In FIG. 15, a sequence of requests and the like exchanged between the servers (101-1 to 101-3) and the management apparatus 201 from when a load has been increased and the new power has been required in the server 101-1 until when the additional power is secured and component power limit is mitigated, is shown.

Next, exemplary advantages of this exemplary embodiment will be described.

According to this exemplary embodiment, in the computer system in which limited power is shared among the multiple servers (101-1 to 101-n), it is possible to intend to effectively utilize the surplus power. It is because the redundant power in the maximum power consumption value currently set in each of the servers (101-1 to 101-n) is recycled and retained as surplus power, and the power is distributed from the surplus power with respect to the server requesting the additional power.

Moreover, according to this exemplary embodiment, in the computer system in which the limited power is shared among the multiple servers (101-1 to 101-n), it is possible to simultaneously realize both the effective utilization of the surplus power and the performance guarantee. It is because the minimum power consumption value has been set in each of the respective servers 101-1 to 101-n so that the total of the minimum power consumption value becomes less than or equal to the upper power limit value 221. If there is no margin of a surplus power, then the control apparatus 211 of the management apparatus 201 forcibly collects all or some of the power exceeding the minimum power consumption value as the surplus power from another server securing the power more than or equal to the minimum power consumption value as the maximum power consumption value, on the condition that the current maximum power consumption value of the server requesting the additional power is less than the minimum power consumption value guaranteed for the server, and subsequently distributes the power to the computer requesting the additional power. Therefore, it is not necessary to previously secure the power in order to guarantee the performance, as in Patent Document 1.

It should be noted that, although the components targeted for power adjustment within the servers (101-1 to 101-n) have been four components of the processor 111, the memory 112, the chip set 113 and the disk drive 114 in this exemplary embodiment, there may be at least one type of the component targeted for power adjustment, and for example, an exemplary embodiment in which only the processor 111 is the component targeted for power adjustment is also conceivable.

Moreover, although there has been one management apparatus 201 in this exemplary embodiment, as another exemplary embodiment, multiple management apparatuses 201 may be provided in order to provide redundancy. In this case, even if one management apparatus becomes inoperative, another management apparatus compensates for its function, and thereby the exemplary operation as the system is continued. Moreover, as another exemplary embodiment, there may be a configuration in which one of the respective servers (101-1 to 101-*n*) is selected and caused to also operate as the management apparatus. In this case, the server selected as the management apparatus performs the power management of the server group also including the server itself.

3. Third Exemplary Embodiment

Figure 16:
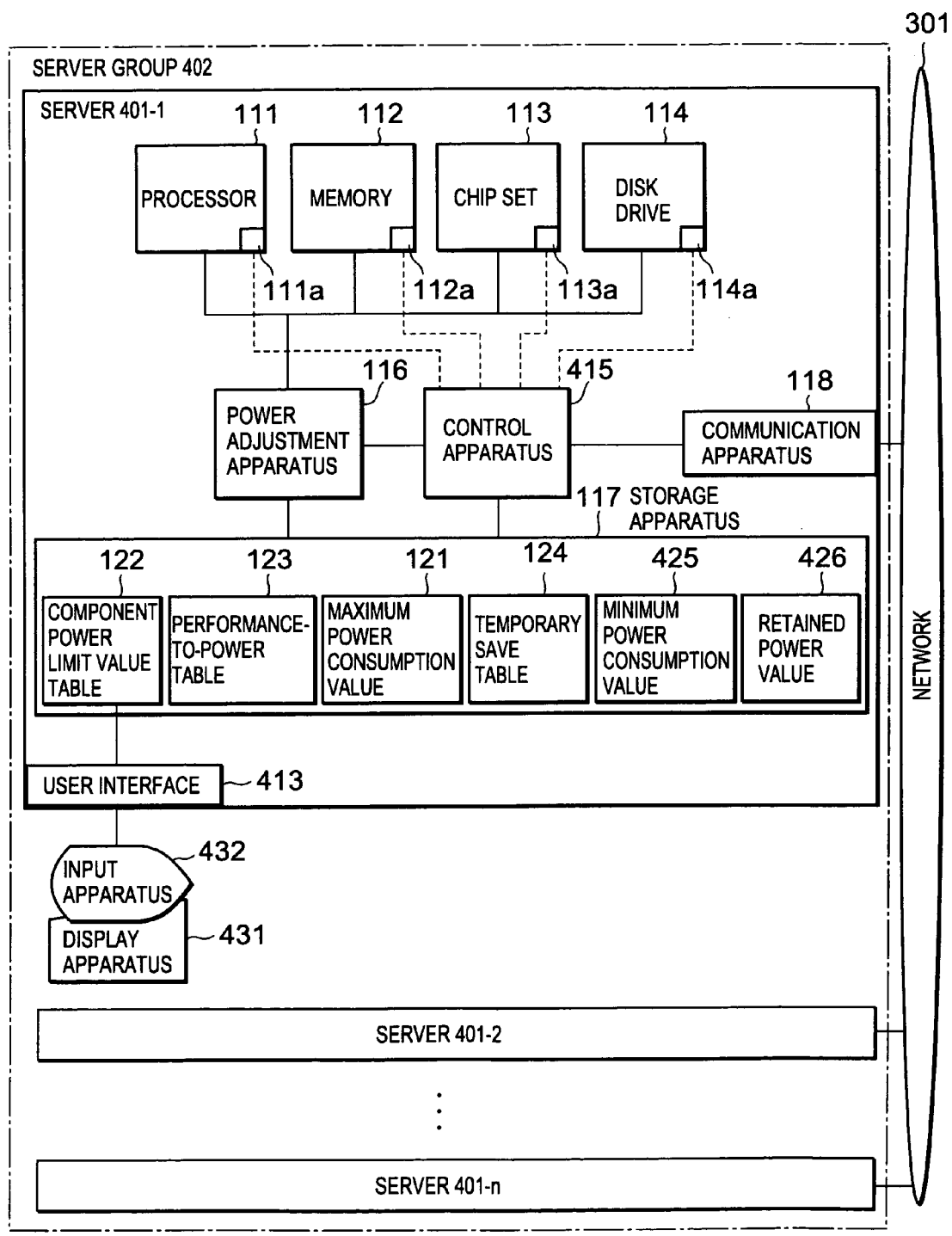
FIG. 16 is a block diagram of a third exemplary embodiment of the present invention.

With reference to FIG. 16, in the computer system according to the third exemplary embodiment of the present invention, multiple servers (401-1 to 401-*n*) may be connected so that the multiple servers (401-1 to 401-*n*) may mutually communicate through the network 301 such as the LAN, and the management apparatus 201 as in the second exemplary embodiment shown in FIG. 2, does not exist in the third exemplary embodiment.

The server 401-1 may be provided with the processor 111, the memory 112, the chip set 113, the disk drive 114, a control apparatus 415, the power adjustment apparatus 116, the storage apparatus 117 and the communication apparatus 118. The processor 111, the memory 112, the chip set 113 and the disk drive 114 may be the components which are typically provided in the computer. On the other hand, the control apparatus 415, the power adjustment apparatus 116, the storage apparatus 117 and the communication apparatus 118 may be provided for managing the power of the server 401-1 and an entire server group 402, in cooperation with other servers (401-2 to 401-*n*). Moreover, the processor 111, the memory 112, the chip set 113 and the disk drive 114 may be attached with the power sensors 111*a* to 114*a* for measuring the actual power, respectively. Also, other servers (401-2 to 401-*n*) have the same configuration and functions as the server 401-1.

In the storage apparatus 117, the maximum power consumption value 121, the component power limit value table 122, the performance-to-power table 123, the temporary save table 124, a minimum power consumption value 425 and a retained power value 426 have been stored. The storage apparatus 117 may be referred to from the power adjustment apparatus 116, and may be referred to and updated from the control apparatus 415.

The retained power value 426 may be a value which defines an upper power limit value of the entire server group 402. Specifically, a total of the retained power value 426 of each of the servers (401-1 to 401-*n*) may match the upper power limit value of the entire server group 402, $W_{GMAX}$.

The maximum power consumption value 121 shows a value of maximum power consumption value currently assigned to the server 401-1. Remaining power obtained by subtracting the maximum power consumption value 121 from the retained power value 426 may be managed as the surplus power which has not been assigned to any of the servers (401-1 to 401-*n*), by the server 401-1. Other servers (401-1 to 401-*n*) also manage similar surplus power, and a total of the surplus power managed by all servers (401-1 to 401-*n*) becomes the surplus power of the entire server group 402.

The component power limit value table 122, the performance-to-power table 123 and the temporary save table 124 are the same as the tables with the same reference numerals in the server 101-1 in the second exemplary embodiment shown in FIG. 2.

The power adjustment apparatus 116 may be an apparatus which adjusts the performance of each power-adjustable component so that the maximum power of the component may not exceed the component power limit value set in the component power limit value table 122, with reference to the performance-to-power table 123, and is the same as the power adjustment apparatus 116 with the same reference numeral in the second exemplary embodiment.

The communication apparatus 118 may be an apparatus for performing communication between the server 401-1 and other servers (401-2 to 401-*n*) through the network 301. Examples of main communication data formats given and received among the servers (401-1 to 401-*n*) are shown in FIG. 17.

Figure 17:
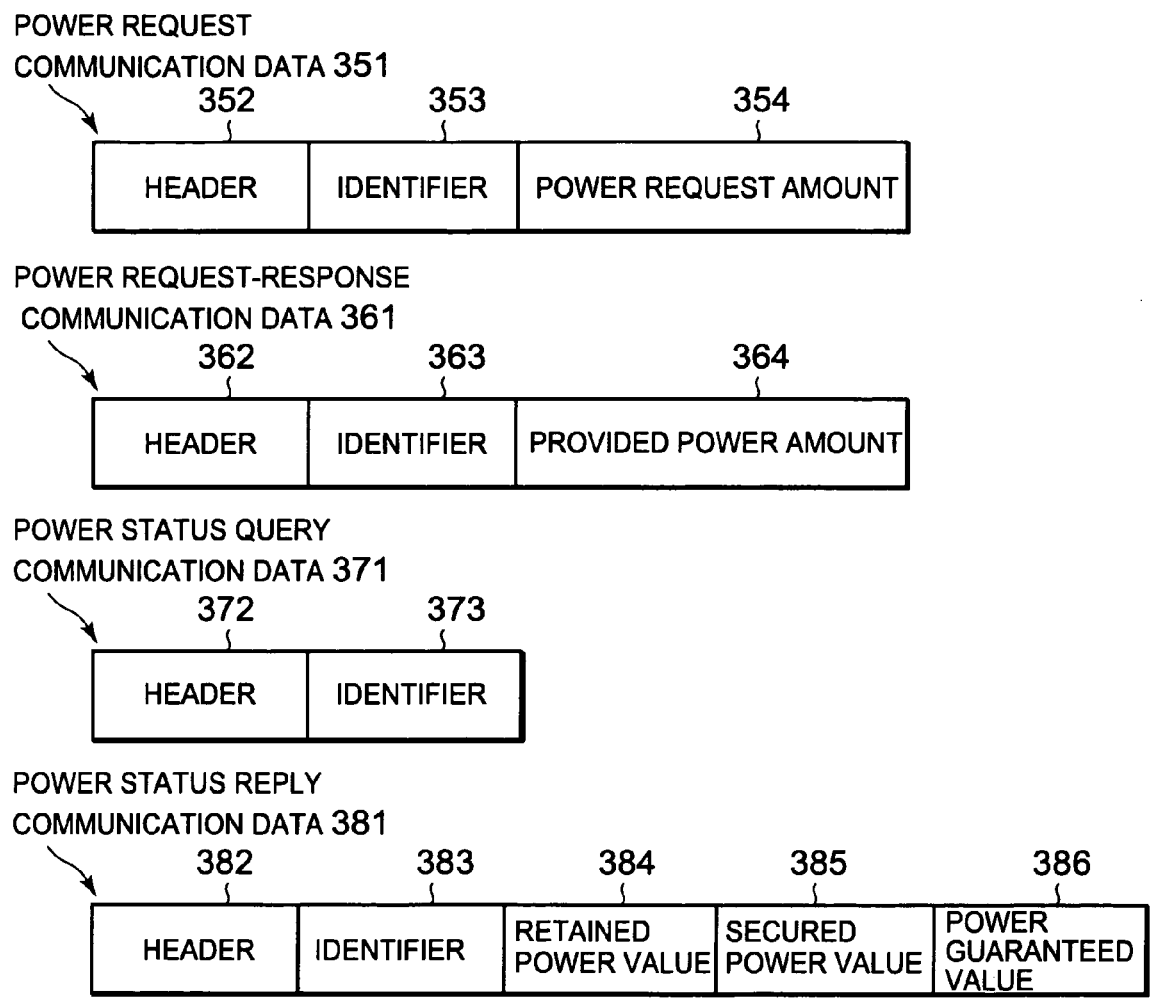
FIG. 17 is a diagram showing an example of communication data used in the third exemplary embodiment of the present invention.

With reference to FIG. 17, power request communication data 351 may be communication data transmitted from the servers (401-1 to 401-*n*) requiring the additional power to other servers (401-1 to 401-*n*). Data 351 may be configured with a communication header 352 including the communicator address, the communication partner address or the like, an identifier 353 for identifying that the communication class is the power request, and an amount of requested power 354.

The power request-response communication data 361 may be communication data transmitted as a response to the power request communication data 351. Data 361 may be configured with a communication header 362 including the communicator address, the communication partner address or the like, an identifier 363 for identifying that the communication class may be the response to the power request, and an amount of provided power 364. If the provided power amount 364 is a value of "0", the above described power request-response communication data 361 may become a rejection response, for example. If the provided power amount 364 is a value other than "0", the above described power request-response communication data 361 may become a permission response, for example.

The power status query communication data 371 may be communication data for making a query about power statuses of other servers (401-1 to 401-*n*) from the servers (401-1 to 401-*n*). Data 371 may be configured with a communication header 372 including the communicator address, the communication partner address or the like, and an identifier 373 for identifying that the communication class may be a power status query.

The power status reply communication data 381 is communication data transmitted as a response to the power status query communication data 371. Data 381 is configured with a communication header 382 including the communicator address, the communication partner address or the like, an identifier 383 for identifying that the communication class is a reply of the power status, and a retained power value 384, a maximum power consumption value 385 and a minimum power consumption value 386 in a communicator server.

The control apparatus 415 may be an apparatus which performs the power management of the server 401-1 and the entire server group 402, in cooperation with the control apparatuses of other servers, and may be connected to the power sensors 111*a* to 114*a*, the power adjustment apparatus 116, the communication apparatus 118 and the storage apparatus 117. The control apparatus 415 includes a function of adjusting the maximum power of each of the components 111 to 114 by using the power adjustment apparatus 116 so that the maximum power consumption of the server 401-1 may not exceed the maximum power consumption value 121.

Moreover, the control apparatus 415 includes a function of determining the state of power excess or shortage in each of the components (111 to 114) based on the actual power measured by the power sensors (111*a* to 114*a*). If there is redundant power, then control apparatus 415 releases some of the maximum power consumption value secured in the server 401-1 as the surplus power. Conversely, if there is a power shortage, then control apparatus 415 requests other servers (401-2 to 401-*n*) for the power amount of the shortage by using the power request communication data 351. Conversely, the control apparatus 415 includes a function of, if the control apparatus 415 has received the power request communication data 351 from other servers (401-2 to 401-n), providing the surplus power.

In response to an exemplary operation from a user input/output apparatus configured with an input apparatus 431 and a display apparatus 432, the user interface 413 displays contents of the retained power value 426, the minimum power consumption value 425 and the maximum power consumption value 121, which have been stored in the storage apparatus 117, on the display apparatus 432, and also changes settings of the retained power value 426 and the minimum power consumption value 425.

When the setting of the retained power value 426 is changed, input is limited so that the total of the retained power value 426 of each of the servers (401-1 to 401-n) may match the predetermined upper power limit value of the entire server group 402. Also, when the setting of the minimum power consumption value 425 is changed, the input is limited so that a total of the minimum power consumption value 425 of each server becomes less than or equal to the upper power limit value of the entire server group 402.

It should be noted that the settings of the retained power value, the minimum power consumption value and the like in other servers (401-2 to 401-n) may also be changed from the user input/output apparatus connected to the user interface 413 of the server 401-1. Moreover, it is also possible to include a configuration in which the storage apparatus 117 may be referred to or updated from the user input/output apparatus connecting to the network 301, through the user interface 413 of arbitrary servers (401-1 to 401-n).

Next, exemplary operations of this exemplary embodiment will be described.

First, an exemplary operation of controlling the maximum power consumption of each of the servers (401-1 to 401-n) so that the maximum power consumption may not exceed the maximum power consumption value 121 set in the server is the same as the second exemplary embodiment. Then, since a total of the maximum power consumption values 121 of the respective servers (401-1 to 401-n) does not exceed the upper power limit value of the entire server group 402, the maximum power consumption of the entire server group 402 may be held within a range of the upper power limit value of the entire server group 402.

Next, an exemplary operation of monitoring the actual power of the servers (401-1 to 401-n) being operated, and based on a result of the monitoring, dynamically releasing some of the power of each server or adding the power to the server will be described.

Figure 18:
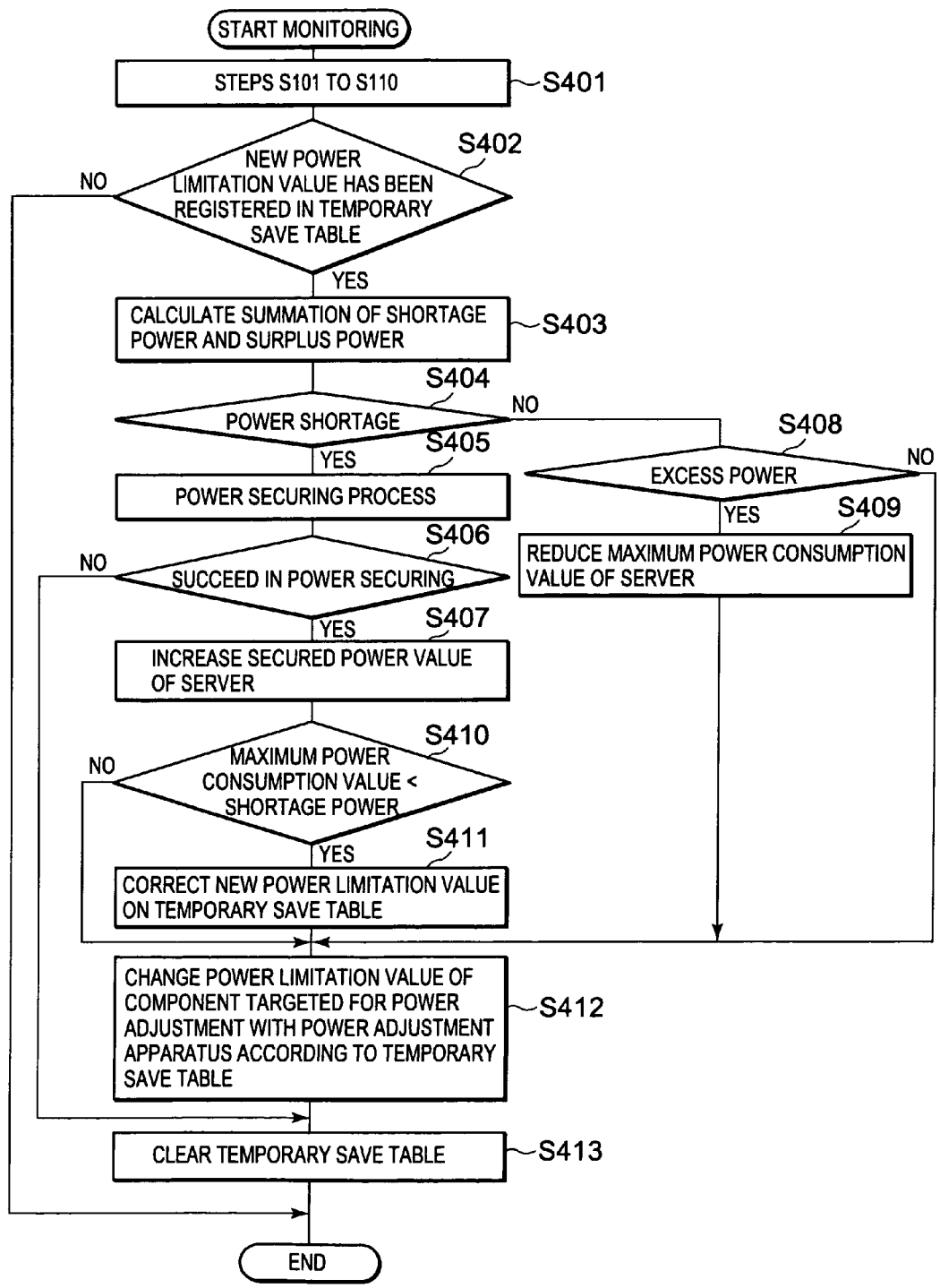
FIG. 18 is a flowchart showing an example of the monitoring process performed by the control apparatus of the server, in the third exemplary embodiment of the present invention.

The control apparatus 415 of the server 401-1 periodically executes a monitoring process shown in FIG. 18. First, processes similar to step S101 to S110 of FIG. 9 are executed (S401). In other words, the actual power in the processor 111, the memory 121, the chip set 113 and the disk drive 114, which may be the components targeted for power adjustment of the server 401-1, is compared with the upper threshold and the lower threshold. Thus, the state of power shortage or the state of excess in those components is detected, and with respect to the component in which the component power limit value is required to be changed, the new component power limit value and the excess or shortage power may be recorded in the temporary save table 124.

Next, the control apparatus 415 determines whether or not at least one new component power limit value has been registered in the temporary save table 124 (S402), and if no new component power limit value has been registered, the control apparatus 415 completes the monitoring process at this time.

If at least one new component power limit value has been registered, then the control apparatus 415 executes the following process.

First, the control apparatus 415 calculates the total of the excess or shortage power registered in the temporary save table 124 (S403). As a result of the calculation, if there is the power shortage (YES at S404), then the control apparatus 415 attempts to secure the shortage power by performing a power securing process described later (S405). Then, if the shortage power has been successfully secured (YES at S406), the maximum power consumption value 121 is increased by the amount of the secured shortage power (S407).

Next, the maximum power consumption value and the shortage power are compared, and if the maximum power consumption value is smaller than the shortage power (YES at S410), the new component power limit value is corrected so that a total of the new component power limit value stored in the temporary save table 124 is reduced by a difference between the shortage power and the maximum power consumption value (S411). At this time, if the new component power limit values of multiple components targeted for power adjustment have been stored in the temporary save table 124, which new component power limit value is corrected is arbitrary, and all may be corrected by the same amount, or the new component power limit value of the low priority component may be preferentially corrected based on the predetermined priorities among the components. Then, the process is advanced to step S412.

On the other hand, if the securing of the shortage power has failed (NO at S406), then the control apparatus 415 clears the fields of the new component power limit value and the excess or shortage power in the temporary save table 124 to empty, and completes the monitoring process of this time (S413).

Moreover, if there is the excess power (YES at S408), then the control apparatus 415 reduces the maximum power consumption value 121 of the server 401-1 by the amount of the excess power (S409), and advances the process to step S412. As described above, since the surplus power managed by the server 401-1 may be the remaining power obtained by subtracting the maximum power consumption value 121 from the retained power value 426, if the maximum power consumption value 121 may be reduced by the amount of the excess power, it means that the surplus power managed by the server 401-1 is increased by the amount of the excess power.

Moreover, if there is no power shortage or excess power and the excess or shortage power has been offset (NO at S408), then the process is advanced to step S412.

At step S412, similarly to step S122 of FIG. 10 in the second exemplary embodiment, according to the temporary save table 124, the control apparatus 415 changes the component power limit value of the component targeted for power adjustment with the power adjustment apparatus 116. At this time, the power adjustment apparatus 116 adjusts the performance of the component targeted for power adjustment depending on the changed component power limit value.

When the control apparatus 415 completes the process of changing the component power limit value according to the temporary save table 124, the control apparatus 415 clears the fields of the new component power limit value and the excess or shortage power in the temporary save table 124 to empty (S413), and completes the monitoring process of this time.

Also, the servers (401-2 to 401-n) other than the server 401-1 periodically execute the monitoring process shown in FIG. 18, similarly to the server 401-1.

Figure 19:
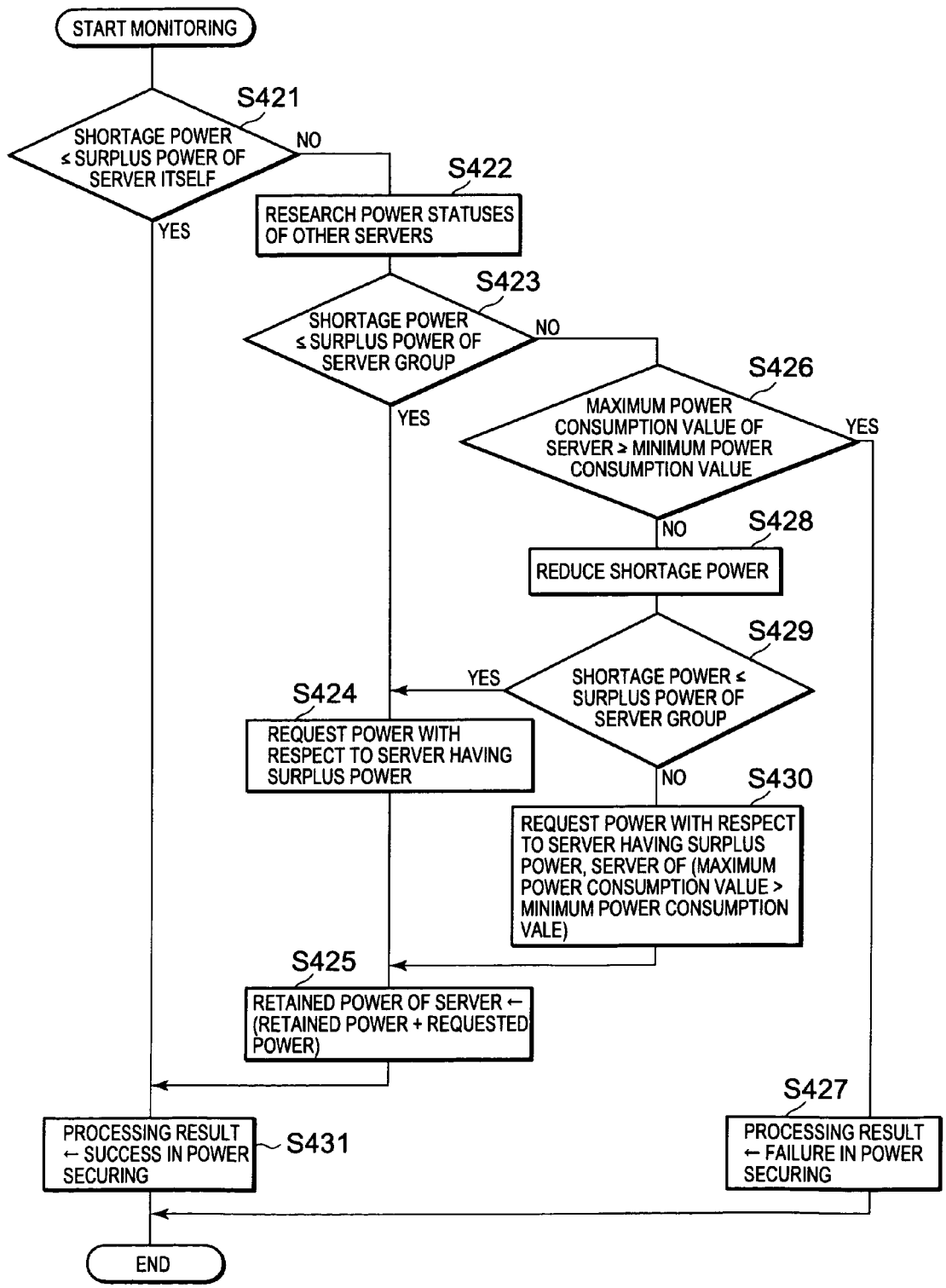
FIG. 19 is a flowchart showing an example of a power securing process performed by the control apparatus of the server, in the third exemplary embodiment of the present invention.

Next, the power securing process at step S405 of FIG. 18 will be described with reference to a flowchart of FIG. 19.

First, the control apparatus 415 of the server 401-1 compares the surplus power which is the remaining power obtained by subtracting the maximum power consumption value 121 from the retained power value 426, with the shortage power, and determines whether or not the surplus power managed by the server 401-1 may be applied to the shortage power (S421). If the shortage power is less than or equal to the surplus power and the application is possible (YES at S421), then a processing result of success in the power securing is generated (S429), and the power securing process is completed.

If the shortage power is larger than the surplus power and the surplus power of the server 401-1 may not cover it (NO at S421), then the power status such as the surplus power of the entire server group 402 is researched (S422). Specifically, first, the power status query communication data 371 may be transmitted from the server 401-1 with respect to all other servers (401-2 to 401-*n*) through broadcast communication or the like. The control apparatus 415 of other servers (401-2 to 401-*n*) which have received the power status query communication data 371 transmits the power status reply communication data 381 in which the retained power value 426, the maximum power consumption value 121 and the minimum power consumption value 425 of the server have been set to the retained power value 384, the maximum power consumption value 385 and the minimum power consumption value 386, respectively, to the server 401-1.

Figure 20:
FIG. 20 is a diagram showing an example of an internal table 427 used by the server in the third exemplary embodiment of the present invention.

The control apparatus 415 of the server 401-1 analyzes the received power status reply communication data 381, and stores the retained power values, the maximum power consumption values and the minimum power consumption values of other servers (401-2 to 401-*n*), for example, in an internal table 427 as shown in FIG. 20. Moreover, the current surplus power and generable surplus power for each server are calculated and recorded in the internal table 427. The generable surplus power may be calculated as remaining power obtained by subtracting the minimum power consumption value from the maximum power consumption value.

Next, the control apparatus 415 compares the surplus power of the entire server group which may be calculated by adding the surplus power of the server 401-1 to a total of the surplus power of other servers (401-2 to 401-*n*), with the shortage power of the server 401-1, and determines whether or not the surplus power of the entire server group may be applied to the shortage power (S423).

If the shortage power is less than or equal to the surplus power of the entire server group and the application is possible (YES at S423), then the power request communication data 351 is used to request the power with respect to another server having the surplus power (S424). The power requested may be remaining power obtained by subtracting the surplus power of the server 401-1 itself from the shortage power. Moreover, if there are multiple other servers including the surplus power, with respect to how much power is requested with respect to which other server, various methods may be conceivable. For example, the power request may be issued to all other servers having the surplus power. In this case, the requested power amount 354 for each server may be equal, or the requested power amount may be larger for the server having larger surplus power. Moreover, in consideration of a priority granted to each server, whether or not there is the power request, and the requested power amount may be controlled.

When the control apparatus 415 of the server 401-1 receives the power request-response communication data 361 of an acknowledgment from all other servers to which the power request communication data 351 has been transmitted, the control apparatus 415 of the server 401-1 increases the retained power value 426 of the server 401-1 by the amount of the requested power (S425), generates the processing result of success in the power securing (S431), and completes the power securing process.

On the other hand, in the case where the shortage power is more than the surplus power of the entire server group (NO at S423), if the maximum power consumption value 121 of the server 401-1 is more than or equal to the minimum power consumption value 425 (YES at S426), then since further addition of the power is not guaranteed under the condition where there is no margin of the surplus power, the control apparatus 415 of the server 401-1 generates a processing result of failure in the power securing operation(S427), and completes the power securing process.

However, if the maximum power consumption value 121 of the server 401-1 is less than the minimum power consumption value 425 (NO at S426), then the control apparatus 415 executes the following process in order to secure the power up to the minimum power consumption value 425.

First, the control apparatus 415 reduces the shortage power of the server 401-1 to the remaining power obtained by subtracting the maximum power consumption value 121 from the minimum power consumption value 425 of the server 401-1 (S428). Next, the reduced shortage power and the surplus power of the server group are compared (S429), and if the surplus power is larger than or equal to the shortage power (YES at S429), since the surplus power may be applied, the power request communication data 351 may be used to request the power with respect to another server including the surplus power (S424), and after waiting for return of the power request-response communication data 361 of the acknowledgment from all other servers to which the power request communication data 351 has been transmitted, the retained power value 426 of the server 401-1 is increased by the amount of the requested power (S425), the processing result of success in the power securing is generated (S429), and the power securing process is completed.

On the other hand, if the surplus power of the server group is less than the shortage power (NO at S429), the control apparatus 415 uses the power request communication data 351 to request the power with respect to the server including the surplus power and the server of (maximum power consumption value>minimum power consumption value). The power requested may be remaining power obtained by subtracting the maximum power consumption value 121 and the surplus power of the server 401-1 from the minimum power consumption value 425 of the server 401-1.

Specifically, first, the power request communication data 351 for requesting another server including the surplus power for all its surplus power is generated. Next, the power request communication data 351 for securing the power of the amount of (shortage power−surplus power) from the server of (maximum power consumption value>minimum power consumption value) is generated. If there are multiple servers (maximum power consumption value>minimum power consumption value), with respect to how much power is requested with respect to which other server, the various methods as described in the second exemplary embodiment are conceivable.

Finally, in the above described generated power request communication data 351, multiple pieces of the communication data in which the request is made to the same server are integrated into one piece of the communication data in which the power request amounts 354 have been added. Then, these pieces of the power request communication data 351 may be transmitted to other servers through the communication apparatus 118. Subsequently, after waiting for the return of the power request-response communication data 361 of the acknowledgment from all other servers to which the power request communication data 351 has been transmitted, the retained power value 426 of the server 401-1 is increased by the amount of the requested power (S425), the processing result of success in the power securing is generated (S429), and the power securing process is completed.

Next, exemplary operations of the servers (401-1 to 401-*n*) which have received the power request communication data 351 issued at steps S424 and S430 of FIG. 19 will be described with an example of the server 401-1.

Figure 21:
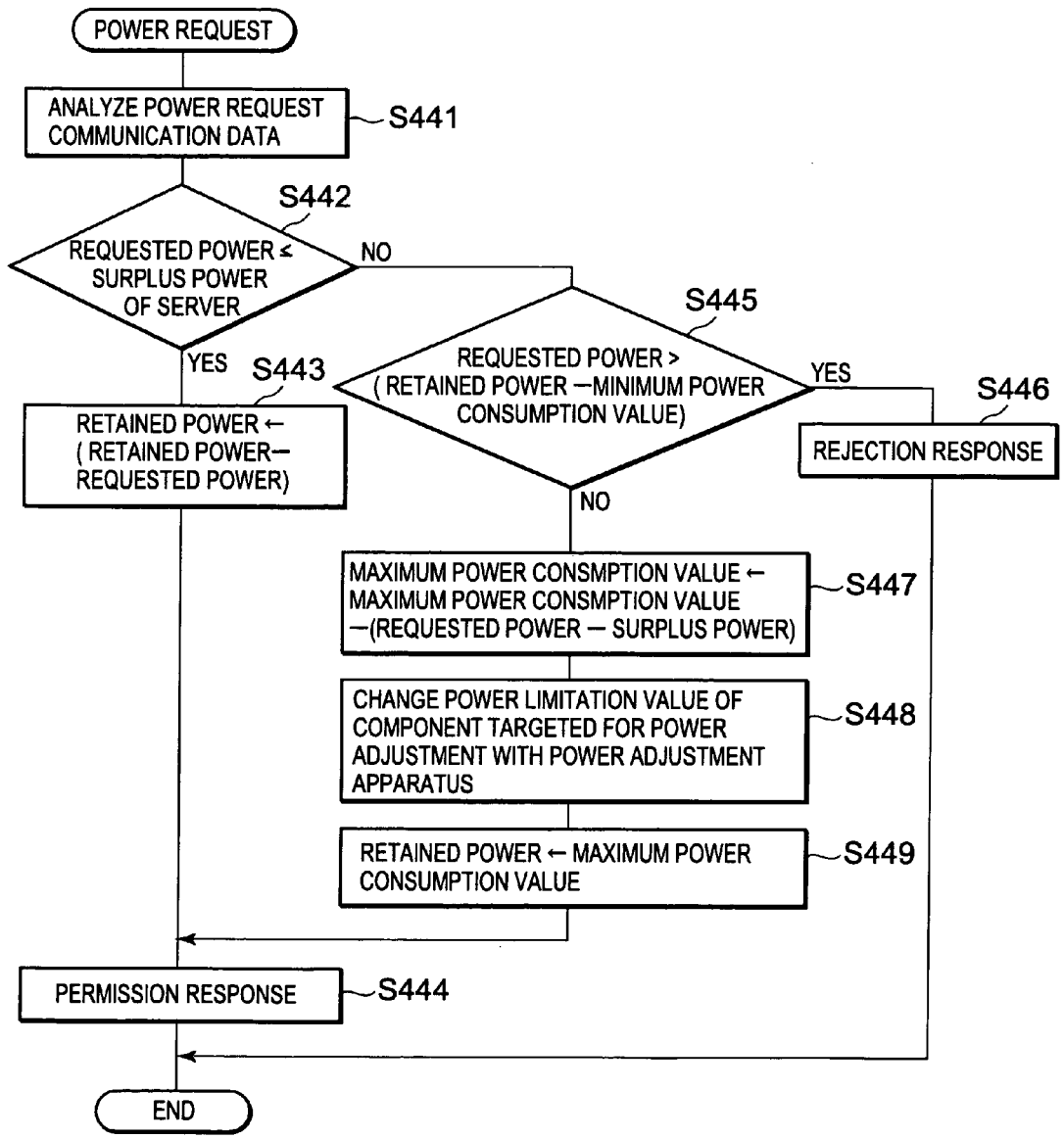
FIG. 21 is a flowchart showing an example of a process performed by the server when the server has received a power request from another server, in the third exemplary embodiment of the present invention.

With reference to FIG. 21, when the control apparatus 415 of the server 401-1 receives the power request communication data 351 transmitted from other servers (401-2 to 401-*n*), through the communication apparatus 118, the control apparatus 415 of the server 401-1 analyzes the communication data 351, and recognizes that it is the power request from a result of analyzing the identifier 353, and the requested power amount from the power request amount 354, respectively (S441).

Next, the control apparatus 415 compares the surplus power which is the remaining power obtained by subtracting the maximum power consumption value 121 from the retained power value 426, with the requested power, and determines whether or not the surplus power managed by the server 401-1 may be applied to the requested power (S442). If the requested power is less than or equal to the surplus power and the application is possible (YES at S442), then the retained power value 426 is reduced by the amount of the requested power (S443), the power request-response communication data 361 in which the power of the amount of the requested power has been written in the provided power amount 364 may be transmitted with respect to the server requesting for the power (S444), and the process is completed.

On the other hand, if the requested power is more than the surplus power of the server 401-1 (NO at S442), then the control apparatus 415 compares (retained power value 426–minimum power consumption value 425) which is a maximum value of the surplus power which may be secured if it is assumed that the maximum power consumption value of the server 401-1 is the minimum power consumption value which is minimally guaranteed, with the requested power (S445).

Then, if the requested power is more than (retained power value 426–minimum power consumption value 425), then in order to reject the power request, the power request-response communication data 361 in which the provided power amount 364 has been set to a value of 0 is transmitted with respect to the server requesting for the power (S446), and the process is completed.

If the requested power is not more than (retained power value 426–minimum power consumption value 425) (NO at S445), then the maximum power consumption value 121 is reduced by an amount of remaining power obtained by subtracting the surplus power of the server itself from the requested power (S447). Next, according to a method similar to step S233 of FIG. 13, the control apparatus 415 changes the component power limit value of the component targeted for power adjustment with the power adjustment apparatus 116, depending on the reduction of the maximum power consumption value 121 (S448). Next, the value of the retained power value 426 is corrected so that the value of the retained power value 426 becomes equal to the value of the maximum power consumption value 121 (S449).

Then, the power request-response communication data 361 in which the power of the amount of the requested power has been written in the provided power amount 364 may be transmitted with respect to the server requesting for the power (S444), and the process is completed.

For example, if the retained power value 426 of the server 401-1 is 150 W, the maximum power consumption value 121 is 120 W, the minimum power consumption value 425 is 100 W, and there has been a power request of 40 W, the determination at step 445 becomes NO, the maximum power consumption value 121 is updated to 110 W at step S447, the component power limit value of the component targeted for power adjustment may be changed at step S448, and subsequently, the retained power value 426 may be updated to 110 W at step S449, and the power request-response communication data 361 in which 40 W has been set to the provided power amount 364 is transmitted at step S444. As a result of this, the surplus power, which has been 30 W just prior to receiving the power request of 40 W, becomes 0 W, and 10 W which is further insufficient may be reduced from the maximum power consumption value 121.

Next, advantages of this exemplary embodiment will be described.

According to this exemplary embodiment, in the computer system in which the limited power is shared among the multiple servers (401-1 to 401-*n*), it is possible to effectively utilize the surplus power. It is because the redundant power in the maximum power consumption value currently set in each of the servers (401-1 to 401-*n*) may be recycled and managed as the surplus power which may be used in any server, for each server, and the power is distributed from the surplus power with respect to the server requesting the additional power.

Moreover, according to this exemplary embodiment, in the computer system in which the limited power is shared among the multiple servers (401-1 to 401-*n*), it is possible to simultaneously realize both the effective utilization of the surplus power and the performance guarantee. It is because the minimum power consumption value has been set in each of the respective servers (401-1 to 401-*n*) so that the total of the minimum power consumption value becomes less than or equal to the upper power limit value of the entire server group, and if there is no margin of the surplus power managed by the server itself, each of the servers (401-1 to 401-*n*) requiring the additional power forcibly collects all or some of the power exceeding the minimum power consumption value as the surplus power from another server securing the power more than or equal to the minimum power consumption value as the maximum power consumption value, on the condition that the current maximum power consumption value is less than the minimum power consumption value. Therefore, it is not necessary to previously secure the power in order to guarantee the performance, as in Patent Document 1.

Moreover, according to this exemplary embodiment, since the management apparatus 201 as in the second exemplary embodiment is not required, costs for the system can be reduced. Moreover, since the functions of the management apparatus 201 may be distributed to the respective servers, even if a failure occurs in any server, the functions may be continued and fault tolerance is improved.

4. Fourth Exemplary Embodiment

Figure 22:
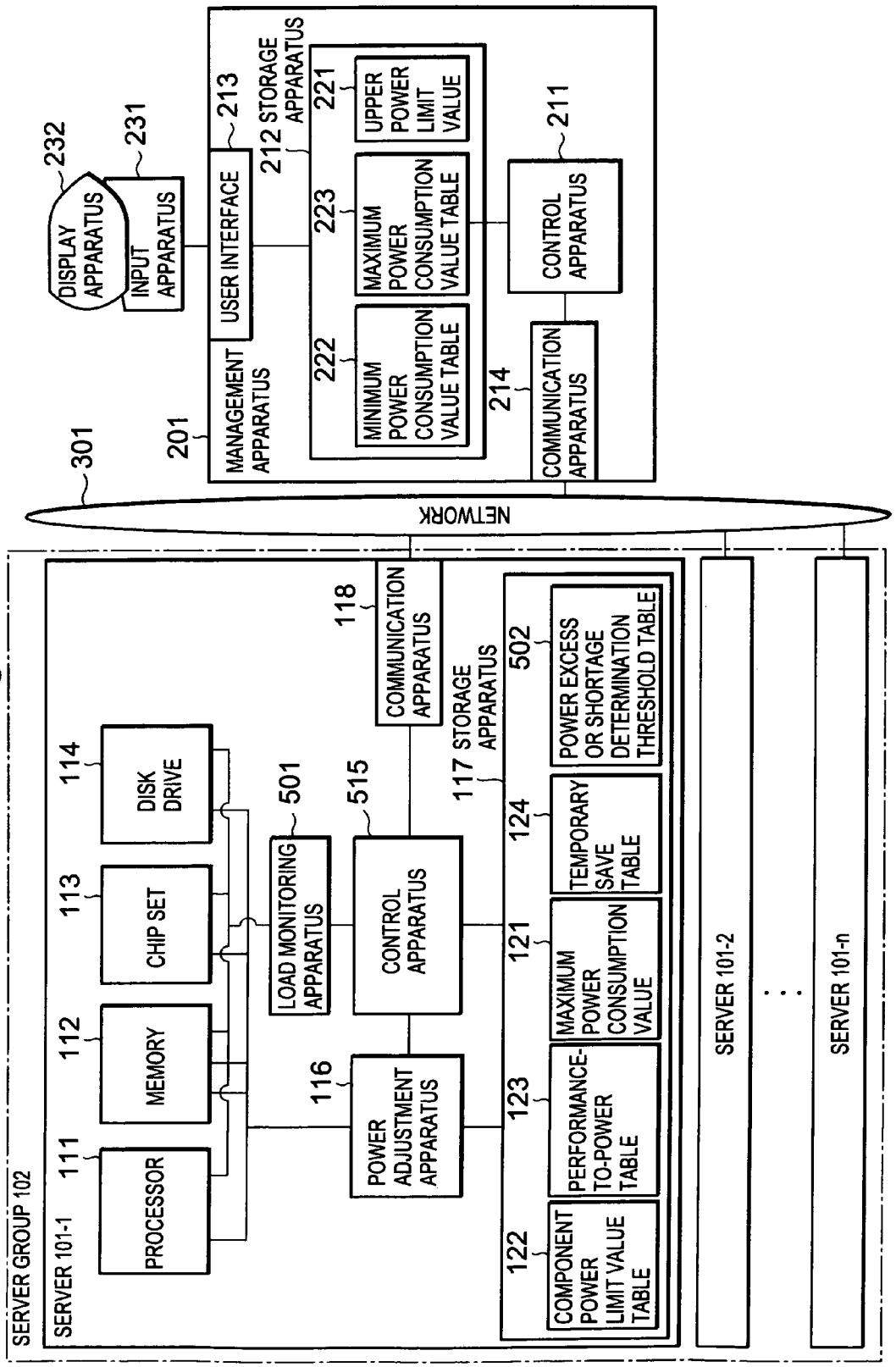
FIG. 22 is a block diagram of a fourth exemplary embodiment of the present invention.

With reference to FIG. 22, in comparison with the second exemplary embodiment shown in FIG. 2, the computer system according to a fourth exemplary embodiment of the present invention is different in that each of the servers (101-1 to 101-*n*) may be provided with a control apparatus 515 instead of the control apparatus 115, that each of the servers (101-1 to 101-*n*) may be newly provided with a load monitoring apparatus 501 and a power excess or shortage determination threshold table 502, and that the power sensors 111a to 114a are not provided.

In the second exemplary embodiment, the actual power in the components targeted for power adjustment 111 to 114 was detected by the power sensors (111a to 114a), and for example, 90% of the component power limit value currently set in the components (111 to 114) was set as the upper threshold, and for example, 70% was set as the lower threshold, and the power excess or shortage in each of the components (111 to 114) was determined by comparing the actual power with the upper threshold and the lower threshold.

In contrast, in this exemplary embodiment, the power excess or shortage in each of the components (111 to 114) may be determined by comparing current load in each of the components (111 to 114) with an upper threshold and a lower threshold stored in the power excess or shortage determination threshold table 502.

The load monitoring apparatus 501 monitors the load in each of the components (111 to 114) and notifies the control apparatus 515 of a result of the monitoring. Types of load to be monitored are, for example, in the case of the processor 111, a processor usage, and in the case of the memory 112, its access rate (transfer rate), and in the case of the chip set, for example, an access rate of a front side bus, and in the case of the disk drive 114, its access rate. The load to be notified may be instantaneous load, or may be a maximum value or average load in a certain past time period.

In the power excess or shortage determination threshold table 502, as shown in FIG. 23, the upper threshold and the lower threshold of each of the components 111 to 114 have been stored. For example, in the case of the processor 111, for example, a CPU usage of 90% as the upper threshold, and for example, the CPU usage of 70% as the lower threshold, have been stored in the power excess or shortage determination threshold table 502. Moreover, in the case of the memory 112, the chip set 113 and the disk drive 114, since a maximum value of the access rate varies depending on the current component power limit value, the upper threshold and the lower threshold have been set for each component power limit value.

The control apparatus 515 compares the current load notified from the load monitoring apparatus 501, with the upper threshold and the lower threshold stored in the power excess or shortage determination threshold table 502, for each of the components (111 to 114). If the current load in the component is high beyond the upper threshold, then it is determined that there is a power shortage since the power has become a rate-limiting element of the performance. Conversely, if the current load in the component is low beyond the lower threshold, then it is determined that there is excess power since the performance may be lower.

Other configurations and exemplary operations may be the same as the second exemplary embodiment.

According to this exemplary embodiment, it is possible to obtain advantages similar to the second exemplary embodiment, and also eliminate the necessity of the power sensors.

It should be noted that, although this exemplary embodiment has been premised on the second exemplary embodiment, an exemplary embodiment premised on the third exemplar embodiment is also conceivable. Moreover, an exemplary embodiment in which the monitoring with the power sensor is performed in some of multiple power-adjustable components and the load monitoring is performed in the rest of the components, is also conceivable.

Although the exemplary embodiments of the present invention have been described above, the present invention is not limited only to the above described exemplary embodiments, and other various additions and alterations are possible. For example, in the case where the present invention is applied to power management of a blade server system, a chassis management module of the blade server system takes on the functions of the management apparatus in the second exemplary embodiment, and thereby, upper limit power control within a chassis becomes possible. Moreover, the upper limit power control across multiple chassis may be performed without the management apparatus by regarding a blade server chassis as one server, connecting multiple blade server chassis in a network and operating them in a configuration as the third exemplary embodiment. Furthermore, the power adjustment apparatus and the control apparatus within the server, and the control apparatus within the management apparatus in the above described respective exemplary embodiments can be realized in hardware, and in addition, may be realized with a computer and a program. The program may be recorded in a computer readable recording medium such as a magnetic disk or a semiconductor memory and provided, and read by the computer when the computer is started up or the like. The program causes the computer to function as the power adjustment apparatus and the control apparatus within the server, or the control apparatus of the management apparatus in the above described respective exemplary embodiments, by controlling exemplary operations of the computer.

Further, it is noted that applicant's intent is to encompass equivalents of all claim elements, even if amended later during prosecution.

What is claimed is:

1. An apparatus which communicates with another apparatus, comprising:
    a control unit which monitors a power consumption of said apparatus, supplies a power to said another apparatus when said power consumption comprises a surplus, and requests said another apparatus to supply said power when said power consumption comprises a shortage;
    an adjusting unit which adjusts said power consumption of said apparatus according to an operation of said control unit,
    wherein said adjusting unit adjusts said power consumption within a maximum power consumption of said apparatus; and
    a component which is adjustable in its power consumption, said component being adjustable within a component power limit determined according to said maximum power consumption of said apparatus, wherein said adjusting unit adjusts said power consumption of said apparatus by adjusting said power consumption of said component within said component power limit, and
    wherein said control unit monitors whether said power consumption of said apparatus comprises said surplus or said shortage by comparing said power consumption of said component with an upper limit value and a lower limit value, said upper limit value and said lower limit value being determined according to said component power limit.

2. The apparatus according to claim 1, wherein said control unit supplies or requests said power within a power limit, said power limit comprising a total of a first maximum power consumption of said apparatus and a second maximum power consumption of said another apparatus.

3. The apparatus according to claim 1, wherein said control unit supplies said power to said apparatus from a surplus power retained in said apparatus when said power consumption of said apparatus comprises said shortage, and wherein said control unit requests said another apparatus to supply said power when said surplus power retained in said apparatus is insufficient to compensate for said shortage of said power consumption of said apparatus.

4. The apparatus according to claim 1, wherein said adjusting unit adjusts said power consumption within a first maximum power consumption of said apparatus, wherein said control unit supplies or requests said power within a power limit, said power limit comprising a total of said first maximum power consumption and a second maximum power consumption of said another apparatus, wherein said apparatus and said another apparatus include a first minimum power consumption and a second minimum power consumption, respectively, wherein said control unit reduces said power of said another apparatus when a power consumption of said another apparatus comprises said surplus, and saves said reduced power as a surplus power in a range from said second minimum power consumption to said second maximum power consumption, and wherein said control unit supplies said surplus power to said apparatus within said power limit when said first maximum power consumption is less than said first minimum power consumption.

5. The apparatus according to claim 4, wherein said control unit reduces said power of said another apparatus to less than said second minimum power consumption when said surplus power is insufficient to compensate for said shortage of said power consumption of said apparatus.

6. The apparatus according to claim 1, wherein, said upper limit value and said lower limit value comprise a predetermined value.

7. A system including a first apparatus and a second apparatus, comprising:
a control unit which monitors a power consumption of said first apparatus, supplies a power to said second apparatus when said power consumption comprises a surplus, and requests said second apparatus to supply said power when said power consumption comprises a shortage;
an adjusting unit which adjusts said power consumption of said first apparatus according to an operation of said control unit,
wherein said adjusting unit adjusts said power consumption within a maximum power consumption of said first apparatus; and
a component which is adjustable in its power consumption, said component being adjustable within a component power limit determined according to said maximum power consumption of said first apparatus, wherein said adjusting unit adjusts said power consumption of said first apparatus by adjusting said power consumption of said component within said component power limit, and
wherein said control unit monitors whether said power consumption of said first apparatus comprises said surplus or said shortage by comparing said power consumption of said component with an upper limit value and a lower limit value, said upper limit value and said lower limit value being determined according to said component power limit.

8. The system according to claim 7, wherein said control unit supplies or requests said power within a power limit, said power limit comprising a total of a first maximum power consumption of said first apparatus and a second maximum power consumption of said second apparatus.

9. The system according to claim 7, wherein said control-unit supplies said power to said first apparatus from a surplus power retained in said first apparatus when said power consumption of said first apparatus comprises said shortage, and wherein said control unit requests said second apparatus to supply said power when said surplus power retained in said first apparatus is insufficient to compensate for said shortage of said power consumption of said first apparatus.

10. The system according to claim 7, wherein said adjusting unit adjusts said power consumption within a first maximum power consumption of said first apparatus, wherein said control unit supplies or requests said power within a power limit, said power limit comprising a total of said first maximum power consumption and a second maximum power consumption of said second apparatus, wherein said first apparatus and said second apparatus include a first minimum power consumption and a second minimum power consumption, respectively, wherein said control unit reduces said power of said second apparatus when a power consumption of said second apparatus comprises said surplus, and saves said reduced power as a surplus power in a range from said second minimum power consumption to said second maximum power consumption, and wherein said control unit supplies said surplus power to said first apparatus within said power limit when said first maximum power consumption is less than said first minimum power consumption.

11. The system according to claim 10, wherein said control unit reduces said power of said second apparatus to less than said second minimum power consumption when said surplus power is insufficient to compensate for said shortage of said power consumption of said first apparatus.

12. The system according to claim 7, wherein said upper limit value and said lower limit value comprise a predetermined value.

13. A method of controlling a first apparatus and a second apparatus, comprising:
monitoring a power consumption of said first apparatus;
supplying a power to said second apparatus when said power consumption comprises a surplus;
requesting said second apparatus to supply said power when said power consumption comprises a shortage;
adjusting said power consumption of said first apparatus according to an operation of a control unit;
adjusting said power consumption within a maximum power consumption of said first apparatus;
adjusting a power consumption of a component installed in said first and second apparatus, said component being adjustable within a component power limit determined according to said maximum power consumption of said first apparatus;
adjusting said power consumption of said first apparatus by adjusting said power consumption of said component within said component power limit, and
monitoring whether said power consumption of said first apparatus comprises said surplus or said shortage by comparing said power consumption of said component with an upper limit value and a lower limit value, said upper limit value and said lower limit value being determined according to said component power limit.

14. The method according to claim 13, further comprising: supplying or requesting said power within a power limit, said power limit comprising a total of a first maximum power consumption of said first apparatus and a second maximum power consumption of said second apparatus.

15. The method according to claim 13, further comprising: supplying said power to said first apparatus from a surplus power retained in said first apparatus when said power consumption of said first apparatus comprises said shortage; requesting said second apparatus to supply said power when said surplus power retained in said first apparatus is insufficient to compensate for said shortage of said power consumption of said first apparatus.

16. The method according to claim 13, further comprising: adjusting said power consumption within a first maximum power consumption of said first apparatus; supplying or requesting said power within a power limit, said power limit comprising a total of said first maximum power consumption and a second maximum power consumption of said second apparatus, wherein said first apparatus and said second apparatus include a first minimum power consumption and a second minimum power consumption, respectively; reducing said power of said second apparatus when a power consumption of said second apparatus comprises said surplus; saving said reduced power as a surplus power in a range from said second minimum power consumption to said second maximum power consumption; and supplying said surplus power to said first apparatus within said power limit when said first maximum power consumption is less than said first minimum power consumption.

17. The method according to claim 16, further comprising: reducing said power of said second apparatus to less than said second minimum power consumption when said surplus power is insufficient to compensate for said shortage of said power consumption of said first apparatus.

18. The method according to claim 13, wherein said upper limit value and said lower limit value comprise a predetermined value.

* * * * *